United States Patent
Islam et al.

(10) Patent No.: US 12,402,107 B2
(45) Date of Patent: Aug. 26, 2025

(54) BANDWIDTH PART CONFIGURATION FOR REDUCED CAPABILITY DEVICES

(71) Applicant: QUALCOMM Incorporated, San Diego, CA (US)

(72) Inventors: Muhammad Nazmul Islam, Littleton, MA (US); Yongjun Kwak, San Diego, CA (US); Jing Lei, San Diego, CA (US); Prashant Sharma, San Jose, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 635 days.

(21) Appl. No.: 17/735,286

(22) Filed: May 3, 2022

(65) Prior Publication Data

US 2023/0363004 A1 Nov. 9, 2023

(51) Int. Cl.
*H04W 74/08* (2024.01)
*H04W 72/0453* (2023.01)
*H04W 74/00* (2009.01)
*H04W 74/0833* (2024.01)

(52) U.S. Cl.
CPC ... *H04W 74/0833* (2013.01); *H04W 72/0453* (2013.01); *H04W 74/004* (2013.01)

(58) Field of Classification Search
CPC .......... H04W 74/004; H04W 74/0833; H04W 72/0453
See application file for complete search history.

(56) References Cited

U.S. PATENT DOCUMENTS

| | | | | |
|---|---|---|---|---|
| 2022/0174697 | A1* | 6/2022 | Jung | H04L 1/1893 |
| 2022/0418000 | A1* | 12/2022 | Zhang | H04L 5/0053 |
| 2023/0042400 | A1* | 2/2023 | Gursu | H04W 56/001 |
| 2023/0115368 | A1* | 4/2023 | Parichehrehteroujeni | G06N 20/00 706/46 |
| 2023/0269777 | A1* | 8/2023 | Lee | H04W 52/14 370/329 |

(Continued)

OTHER PUBLICATIONS

Catt: "Discussion on Reduced Maximum UE Bandwidth", 3GPP TSG RAN WG1 #106-e, R1-2106977, 3rd Generation Partnership Project (3GPP), Mobile Competence Centre, 650, Route Des Lucioles, F-06921 Sophia-Antipolis Cedex, France, vol. Ran WG1, No. e-Meeting, Aug. 16, 2021-Aug. 27, 2021, Aug. 7, 2021, 7 Pages, XP052038150, paragraph [0002].

(Continued)

*Primary Examiner* — Brian D Nguyen
(74) *Attorney, Agent, or Firm* — Holland & Hart LLP

(57) ABSTRACT

Methods, systems, and devices for wireless communications are described. A user equipment (UE) may receive a message that indicates a first initial uplink bandwidth part for use by the UE in communications with a network entity, the message also indicating a plurality of random access occasions, at least one of the plurality of random access occasions being in frequency resources that are outside of the first initial uplink bandwidth part. The UE may select a random access occasion of the plurality of random access occasions for transmission of a random access preamble from the UE to the network entity. The UE may transmit, as part of a random access procedure, the random access preamble within the random access occasion.

30 Claims, 17 Drawing Sheets

(56) References Cited

U.S. PATENT DOCUMENTS

2023/0389084 A1* 11/2023 Belleschi .......... H04W 74/0833
2024/0049035 A1* 2/2024 He .................... H04W 24/10
2024/0323860 A1* 9/2024 Zhang ................ H04W 52/146

OTHER PUBLICATIONS

Huawei, et al., "Discussion on Reduced Maximum UE Bandwidth for RedCap", 3GPP TSG RAN WG1 #105-e, R1-2104283, 3rd Generation Partnership Project (3GPP), Mobile Competence Centre, 650, Route Des Lucioles, F-06921 Sophia-Antipolis Cedex, France, vol. RAN WG1, No. e-Meeting, May 10, 2021-May 27, 2021, May 12, 2021, 12 Pages, XP052010737, paragraph [0002].

International Search Report and Written Opinion—PCT/US2023/015860—ISA/EPO—Jul. 6, 2023.

Oppo: "Discussion on Reduced UE Bandwidth", 3GPP TSG RAN WG1 #105-e, R1-2104782, 3rd Generation Partnership Project (3GPP), Mobile Competence Centre, 650, Route Des Lucioles, F-06921 Sophia-Antipolis Cedex, France, vol. RAN WG1, No. e-Meeting, May 10, 2021-May 27, 2021, May 12, 2021, 12 Pages, XP052011023, paragraph [0001]—paragraph [0002], figures 1-5.

Oppo: "Discussion on Reduced UE Bandwidth", 3GPP TSG RAN WG1 #106-e, R1-2107249, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, 9 Pages, XP052038244, figures 1-5.

Qualcomm Incorporated: "BW Reduction for RedCap UE", 3GPP TSG-RAN WG1 Meeting #106, R1-2107351, 3GPP, Mobile Competence Centre, 650, Route Des Lucioles, F- 06921 Sophia-Antipolis Cedex, France, vol. RAN WG1, No. e-Meeting, Aug. 16, 2021-Aug. 27, 2021, Aug. 7, 2021, 24 Pages, XP052038299, Sec 2.1, p. 1-2, Proposal 4, p. 4 Sec 2.2, p. 6-7 Sec 2.3, p. 8-9 Proposal 27, p. 20, Sec 1, 2.1.1, 2.2, 2.3, p. 1-10, p. 2, Sec 2.1.2, p. 9, Sec 2.3, fig 7, paragraph [02.1]—paragraph [02.2].

* cited by examiner

Non-RedCap Initial UL BWP 310

Non-RedCap Initial DL BWP 315 eRedCap Initial DL BWP 320 eRedCap Initial UL BWP 325-a eRedCap Initial UL BWP 325-b eRedCap Initial DL BWP 330-a eRedCap Initial DL BWP 330-b

BANDWIDTH PART CONFIGURATION FOR REDUCED CAPABILITY DEVICES

TECHNICAL FIELD

The following relates to wireless communications, including bandwidth part configuration for reduced capability devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications system, a reduced capability wireless device may establish communications with a network. However, methods for establishing communications between a reduced capability wireless device and a network may be improved.

SUMMARY

The described techniques relate to improved methods, systems, devices, and apparatuses that support bandwidth part configuration for reduced capability devices. For example, a user equipment (UE) (e.g., a reduced capability device) may receive a synchronization signal block message that indicates a first initial uplink bandwidth part for use by the UE in communications with a network entity. The synchronization signal block message may also indicate a plurality of random access occasions for the UE to use for transmission of a first random access message to the network entity. The plurality of random access occasions may be in frequency resources that are outside of the first initial uplink bandwidth part. For example, the plurality of random access occasions may be in respective initial uplink bandwidth parts (the first initial uplink bandwidth part and additional initial uplink bandwidth parts). In another example, the plurality of random access occasions may be outside of the first initial uplink bandwidth part but still associated with the first initial uplink bandwidth part. The UE may select a random access occasion of the plurality of random access occasions for transmission of a random access preamble from the UE to the network entity. The UE may transmit, as part of a random access procedure, the random access preamble within the random access occasion.

A method for wireless communications at a UE is described. The method may include receiving a message that indicates a first initial uplink bandwidth part for use by the UE in communications with a network entity, the message also indicating a set of multiple random access occasions, at least one of the set of multiple random access occasions being in frequency resources that are outside of the first initial uplink bandwidth part, selecting a random access occasion of the set of multiple random access occasions for transmission of a random access preamble from the UE to the network entity, and transmitting, as part of a random access procedure, the random access preamble within the random access occasion.

An apparatus for wireless communications at a UE is described. The apparatus may include a processor, memory coupled with the processor, and instructions stored in the memory. The instructions may be executable by the processor to cause the apparatus to receive a message that indicates a first initial uplink bandwidth part for use by the UE in communications with a network entity, the message also indicating a set of multiple random access occasions, at least one of the set of multiple random access occasions being in frequency resources that are outside of the first initial uplink bandwidth part, select a random access occasion of the set of multiple random access occasions for transmission of a random access preamble from the UE to the network entity, and transmit, as part of a random access procedure, the random access preamble within the random access occasion.

Another apparatus for wireless communications at a UE is described. The apparatus may include means for receiving a message that indicates a first initial uplink bandwidth part for use by the UE in communications with a network entity, the message also indicating a set of multiple random access occasions, at least one of the set of multiple random access occasions being in frequency resources that are outside of the first initial uplink bandwidth part, means for selecting a random access occasion of the set of multiple random access occasions for transmission of a random access preamble from the UE to the network entity, and means for transmitting, as part of a random access procedure, the random access preamble within the random access occasion.

A non-transitory computer-readable medium storing code for wireless communications at a UE is described. The code may include instructions executable by a processor to receive a message that indicates a first initial uplink bandwidth part for use by the UE in communications with a network entity, the message also indicating a set of multiple random access occasions, at least one of the set of multiple random access occasions being in frequency resources that are outside of the first initial uplink bandwidth part, select a random access occasion of the set of multiple random access occasions for transmission of a random access preamble from the UE to the network entity, and transmit, as part of a random access procedure, the random access preamble within the random access occasion.

In some examples of the method, apparatuses, and non-transitory computer-readable medium described herein, receiving the message may include operations, features, means, or instructions for receiving an indication of one or more additional initial uplink bandwidth parts for use by the UE in the communications with the network entity, each of the set of multiple random access occasions being in a respective one of the first initial uplink bandwidth part or additional initial uplink bandwidth parts.

Some examples of the method, apparatuses, and non-transitory computer-readable medium described herein may further include operations, features, means, or instructions for communicating additional one or more random access messages that may be associated with transmission of the random access preamble, the one or more random access messages being communicated in frequency resources that may be within a same one of the first initial uplink bandwidth part or the additional initial uplink bandwidth parts in which the random access preamble may be transmitted.

Some examples of the method, apparatuses, and non-transitory computer-readable medium described herein may further include operations, features, means, or instructions for determining that transmission of the random access preamble failed, where the random access preamble was transmitted within a first attempted initial uplink bandwidth part selected from the first initial uplink bandwidth part and the additional initial uplink bandwidth parts, incrementing a preamble power ramping parameter based on failure of the transmission of the random access preamble and on whether the first attempted initial uplink bandwidth part may be to be reused for retransmission of the random access preamble, and retransmitting the random access preamble in accordance with the preamble power ramping parameter.

Some examples of the method, apparatuses, and non-transitory computer-readable medium described herein may further include operations, features, means, or instructions for determining that transmission of the random access preamble failed, where the random access preamble was transmitted within a first attempted initial uplink bandwidth part selected from the first initial uplink bandwidth part and the additional initial uplink bandwidth parts, incrementing a preamble power ramping parameter based on failure of the transmission of the random access preamble, regardless of whether the first attempted initial uplink bandwidth part may be to be reused for retransmission of the random access preamble, and retransmitting the random access preamble in accordance with the preamble power ramping parameter.

Some examples of the method, apparatuses, and non-transitory computer-readable medium described herein may further include operations, features, means, or instructions for determining that transmission of the random access preamble failed and retransmitting the random access preamble via any of the first initial uplink bandwidth part or the additional initial uplink bandwidth parts, where the retransmitting may be in accordance with a maximum number of retransmissions parameter that applies to retransmissions across all of the first initial uplink bandwidth part and the additional initial uplink bandwidth parts, collectively.

Some examples of the method, apparatuses, and non-transitory computer-readable medium described herein may further include operations, features, means, or instructions for determining that transmission of the random access preamble failed, where the random access preamble was transmitted within a first attempted initial uplink bandwidth part selected from the first initial uplink bandwidth part and the additional initial uplink bandwidth parts and retransmitting the random access preamble via the first attempted initial uplink bandwidth part, where the retransmitting may be in accordance with a maximum number of retransmissions parameter that applies to retransmissions per initial uplink bandwidth part.

In some examples of the method, apparatuses, and non-transitory computer-readable medium described herein, selecting the random access occasion may include operations, features, means, or instructions for monitoring an initial downlink bandwidth part for paging occasions during the random access procedure, identifying, from the first initial uplink bandwidth part and the additional initial uplink bandwidth parts, a corresponding initial uplink bandwidth part that corresponds to the initial downlink bandwidth part, and selecting the random access occasion that may be within the corresponding initial uplink bandwidth part based on the corresponding initial uplink bandwidth part corresponding to the initial downlink bandwidth part.

In some examples of the method, apparatuses, and non-transitory computer-readable medium described herein, at most one of the set of multiple the random access occasions may be within the first initial uplink bandwidth part, a remainder of the set of multiple the random access occasions being outside of the first initial uplink bandwidth part but still associated with the first initial uplink bandwidth part.

Some examples of the method, apparatuses, and non-transitory computer-readable medium described herein may further include operations, features, means, or instructions for receiving information that may be indicative of at least one of an offset parameter or a binary direction parameter, where the binary direction parameter indicates a direction in which the offset parameter may be to be applied with respect to a baseline resource block and determining one or more of the frequency resources that may be outside of the first initial uplink bandwidth part based on the information.

In some examples of the method, apparatuses, and non-transitory computer-readable medium described herein, receiving the information that may be indicative of at least one of the offset parameter or the binary direction parameter may include operations, features, means, or instructions for receiving indications of at least one of the offset parameter or the binary direction parameter on a per-random access occasion basis.

In some examples of the method, apparatuses, and non-transitory computer-readable medium described herein, determining one or more of the frequency resources that may be outside of the first initial uplink bandwidth part may include operations, features, means, or instructions for determining, based on the offset parameter, the binary direction parameter, the baseline resource block, and a first frequency resource associated with a first random access occasion of the set of multiple random access occasions and determining additional frequency resources associated with other random access occasions of the set of multiple random access occasions, the additional frequency resources determined in relation to the first frequency resource.

Some examples of the method, apparatuses, and non-transitory computer-readable medium described herein may further include operations, features, means, or instructions for communicating additional one or more random access messages that may be associated with transmission of the random access preamble, the one or more random access messages being communicated in frequency resources that may be within a selected initial uplink bandwidth part that corresponds to the random access occasion.

In some examples of the method, apparatuses, and non-transitory computer-readable medium described herein, communicating the additional one or more random access messages may include operations, features, means, or instructions for receiving a random access response message separated in time from transmission of the random access preamble by a duration of time that includes a bandwidth part switching time gap.

In some examples of the method, apparatuses, and non-transitory computer-readable medium described herein, communicating the additional one or more random access messages may include operations, features, means, or instructions for transmitting a connection request message separated in time from transmission of the random access preamble by a duration of time that includes a bandwidth part switching time gap.

In some examples of the method, apparatuses, and non-transitory computer-readable medium described herein, communicating the additional one or more random access messages may include operations, features, means, or instructions for transmitting a random access request payload separated in time from transmission of the random access preamble by a duration of time that includes a bandwidth part switching time gap, the random access procedure being a two-step random access procedure.

In some examples of the method, apparatuses, and non-transitory computer-readable medium described herein, the message may be received through a system information block, a synchronization signal block, downlink control information, a medium access control control element, radio resource control signaling, a handover command, or any combination thereof.

A method for wireless communications at a network entity is described. The method may include transmitting a message that indicates a first initial uplink bandwidth part for use by a UE in communications with a network entity, the message also indicating a set of multiple random access occasions, at least one of the set of multiple random access occasions being in frequency resources that are outside of the first initial uplink bandwidth part and receiving, as part of a random access procedure, a random access preamble within a random access occasion selected from the plurality of random access occasions.

An apparatus for wireless communications at a network entity is described. The apparatus may include a processor, memory coupled with the processor, and instructions stored in the memory. The instructions may be executable by the processor to cause the apparatus to transmit a message that indicates a first initial uplink bandwidth part for use by the UE in communications with a network entity, the message also indicating a set of multiple random access occasions, at least one of the set of multiple random access occasions being in frequency resources that are outside of the first initial uplink bandwidth part and receive, as part of a random access procedure, a random access preamble within a random access occasion selected from the plurality of random access occasions.

Another apparatus for wireless communications at a network entity is described. The apparatus may include means for transmitting a message that indicates a first initial uplink bandwidth part for use by a UE in communications with a network entity, the message also indicating a set of multiple random access occasions, at least one of the set of multiple random access occasions being in frequency resources that are outside of the first initial uplink bandwidth part and means for receiving, as part of a random access procedure, a random access preamble within a random access occasion selected from the plurality of random access occasions.

A non-transitory computer-readable medium storing code for wireless communications at a network entity is described. The code may include instructions executable by a processor to transmit a message that indicates a first initial uplink bandwidth part for use by a UE in communications with a network entity, the message also indicating a set of multiple random access occasions, at least one of the set of multiple random access occasions being in frequency resources that are outside of the first initial uplink bandwidth part and receive, as part of a random access procedure, a random access preamble within a random access occasion selected from the plurality of random access occasions.

In some examples of the method, apparatuses, and non-transitory computer-readable medium described herein, receiving the message may include operations, features, means, or instructions for transmitting an indication of one or more additional initial uplink bandwidth parts for use by a UE in the communications with the network entity, each of the set of multiple random access occasions being in a respective one of the first initial uplink bandwidth part or additional initial uplink bandwidth parts.

Some examples of the method, apparatuses, and non-transitory computer-readable medium described herein may further include operations, features, means, or instructions for communicating additional one or more random access messages that may be associated with transmission of the random access preamble, the one or more random access messages being communicated in frequency resources that may be within a same one of the first initial uplink bandwidth part or the additional initial uplink bandwidth parts in which the random access preamble may be transmitted.

Some examples of the method, apparatuses, and non-transitory computer-readable medium described herein may further include operations, features, means, or instructions for determining that transmission of the random access preamble failed and receiving a retransmission of the random access preamble via any of the first initial uplink bandwidth part or the additional initial uplink bandwidth parts, where the retransmitting may be in accordance with a maximum number of retransmissions parameter that applies to retransmissions across all of the first initial uplink bandwidth part and the additional initial uplink bandwidth parts, collectively.

In some examples of the method, apparatuses, and non-transitory computer-readable medium described herein, at most one of the set of multiple the random access occasions may be within the first initial uplink bandwidth part, a remainder of the set of multiple the random access occasions being outside of the first initial uplink bandwidth part but still associated with the first initial uplink bandwidth part.

Some examples of the method, apparatuses, and non-transitory computer-readable medium described herein may further include operations, features, means, or instructions for transmitting information that may be indicative of at least one of an offset parameter or a binary direction parameter, where the binary direction parameter indicates a direction in which the offset parameter may be to be applied with respect to a baseline resource block and determining one or more of the frequency resources that may be outside of the first initial uplink bandwidth part based on the information.

In some examples of the method, apparatuses, and non-transitory computer-readable medium described herein, transmitting the information that may be indicative of at least one of the offset parameter or the binary direction parameter may include operations, features, means, or instructions for transmitting indications of at least one of the offset parameter or the binary direction parameter on a per-random access occasion basis.

Some examples of the method, apparatuses, and non-transitory computer-readable medium described herein may further include operations, features, means, or instructions for communicating additional one or more random access messages that may be associated with transmission of the random access preamble, the one or more random access messages being communicated in frequency resources that may be within a selected initial uplink bandwidth part that corresponds to the random access occasion.

In some examples of the method, apparatuses, and non-transitory computer-readable medium described herein, communicating the additional one or more random access messages may include operations, features, means, or instructions for transmitting a random access response message separated in time from transmission of the random access preamble by a duration of time that includes a bandwidth part switching time gap.

In some examples of the method, apparatuses, and non-transitory computer-readable medium described herein, communicating the additional one or more random access messages may include operations, features, means, or instructions for receiving a connection request message separated in time from transmission of the random access preamble by a duration of time that includes a bandwidth part switching time gap.

In some examples of the method, apparatuses, and non-transitory computer-readable medium described herein, communicating the additional one or more random access messages may include operations, features, means, or instructions for receiving a random access request payload separated in time from transmission of the random access preamble by a duration of time that includes a bandwidth part switching time gap, the random access procedure being a two-step random access procedure.

BRIEF DESCRIPTION OF THE DRAWINGS

FIG. 3 illustrates an example of a bandwidth part configuration that supports bandwidth part configuration for reduced capability devices in accordance with one or more aspects of the present disclosure.

DETAILED DESCRIPTION

Figure 1:
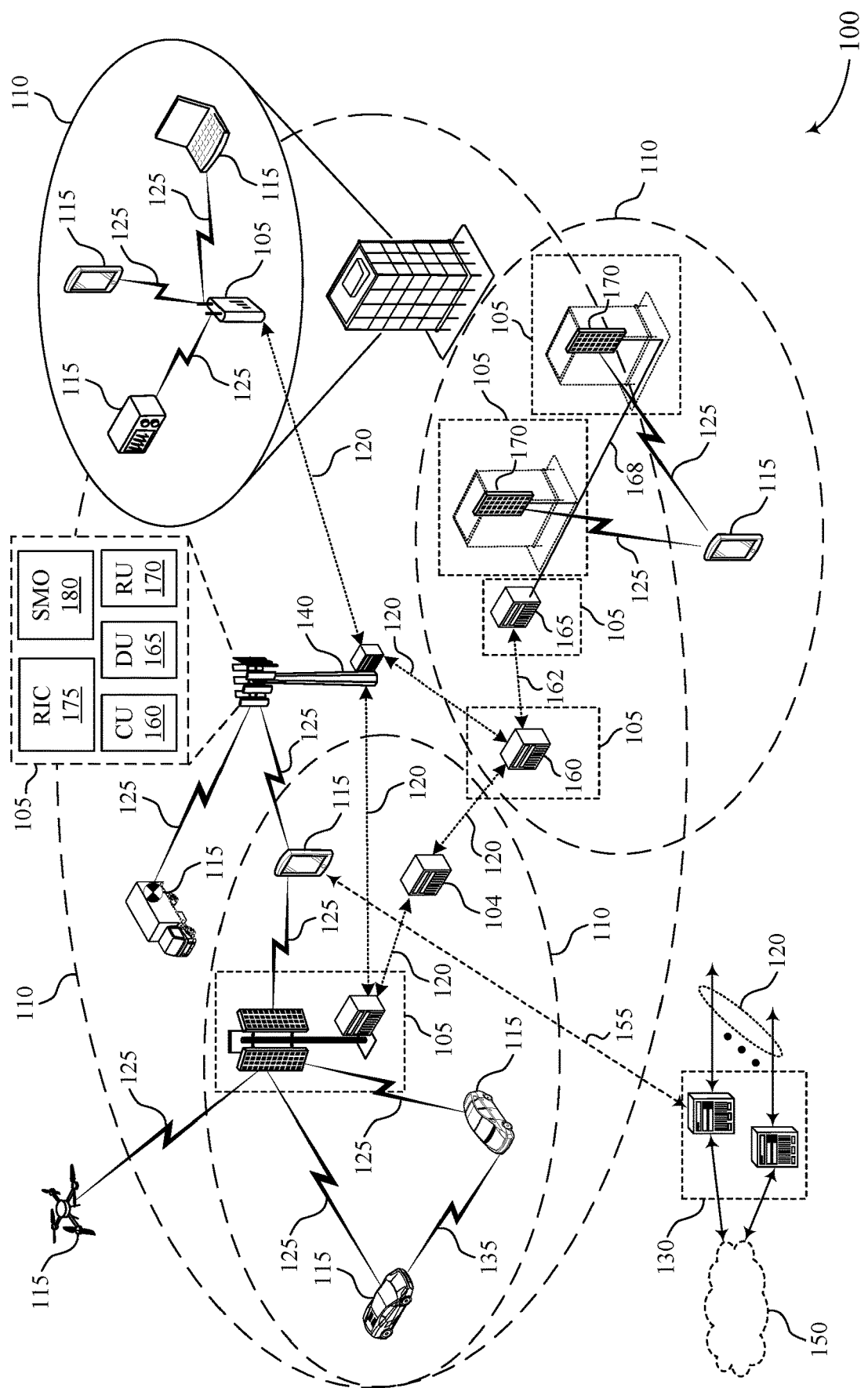
FIG. 1 illustrates an example of a wireless communications system that supports bandwidth part configuration for reduced capability devices in accordance with one or more aspects of the present disclosure.

Some wireless communications systems may support user equipment (UEs) with different capabilities. For example, a wireless communications system may support higher capability UEs with low latency and high data throughput, such as UEs that support ultra-reliable low latency communications (URLLC). The wireless communications system may also support lower capability UEs, or reduced capability UEs, with reduced peak data throughput, latency, reliability, bandwidth, or other characteristics or capabilities. For example, some devices may operate within a limited radio frequency (RF) bandwidth. However, such bandwidth parameters may limit a number of random access occasions available to reduced capability UEs during a random access procedure and may further limit a number of reduced capability UEs that may be accommodated within an initial bandwidth part used for the random access procedure.

To reduce or eliminate such challenges, a network entity may indicate multiple random access occasions that may be associated with one or more initial uplink bandwidth parts for performing a random access procedure. In some examples, a network entity may configure multiple initial uplink bandwidth parts each including a random access occasion within the corresponding initial uplink bandwidth part. In other examples, a network entity may configure multiple random access occasions associated with a single initial uplink bandwidth part (e.g., through frequency domain multiplexing) and one or more of the multiple random access occasions may lie in a frequency range falling outside of a frequency range of the initial uplink bandwidth part. A reduced capability UE may perform a portion of a random access procedure (such as transmitting a random access preamble) within a random access occasion outside of the initial uplink bandwidth part and may perform one or more other portions of the random access procedure within the initial uplink bandwidth part.

In some examples, a network entity may configure the multiple random access occasions in various ways. For example, the network entity may configure a binary direction parameter that indicates a direction away from a reference point (e.g., higher frequency or lower frequency) in which multiple random access occasions may be allocated. In some examples, the network entity may configure a variable offset or reference point from which the random access occasions may be located by the UE (e.g., instead of using a physical resource block of the bandwidth part as such a reference). Additionally, or alternatively, the network entity may configure an offset parameter for each random access occasion that may indicate its frequency resource allocation.

Aspects of the disclosure are initially described in the context of wireless communications systems. Aspects of the disclosure are then described with reference to bandwidth part configurations and a process flow. Aspects of the disclosure are further illustrated by and described with reference to apparatus diagrams, system diagrams, and flowcharts that relate to bandwidth part configuration for reduced capability devices.

FIG. 1 illustrates an example of a wireless communications system 100 that supports bandwidth part configuration for reduced capability devices in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support bandwidth part configuration for reduced capability devices as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), etc., and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

For example, a reduced capability UE may receive an indication of multiple random access occasions that may be associated with one or more initial UL BWPs that may be used for performing a random access procedure. In some examples, each initial UL BWP may include a corresponding random access occasion, while in other examples some of the multiple random access occasions may be located in frequency resources outside of the initial UL BWP. The UE may select a random access occasion of the multiple random access occasions and may transmit a random access preamble (e.g., Msg1 of a random access channel (RACH) procedure) within the random access occasion.

Figure 2A:
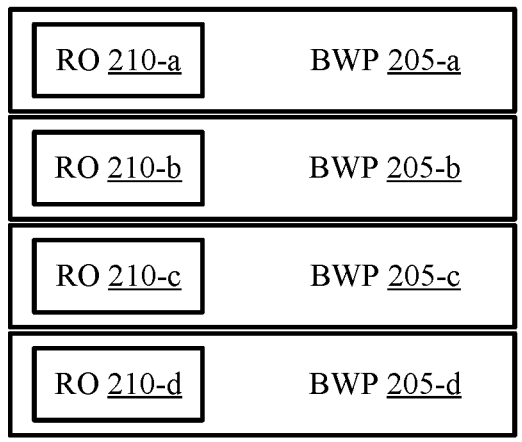
FIGS. 2A and 2B illustrate examples of a bandwidth part configuration that supports bandwidth part configuration for reduced capability devices in accordance with one or more aspects of the present disclosure.
Figure 2B:
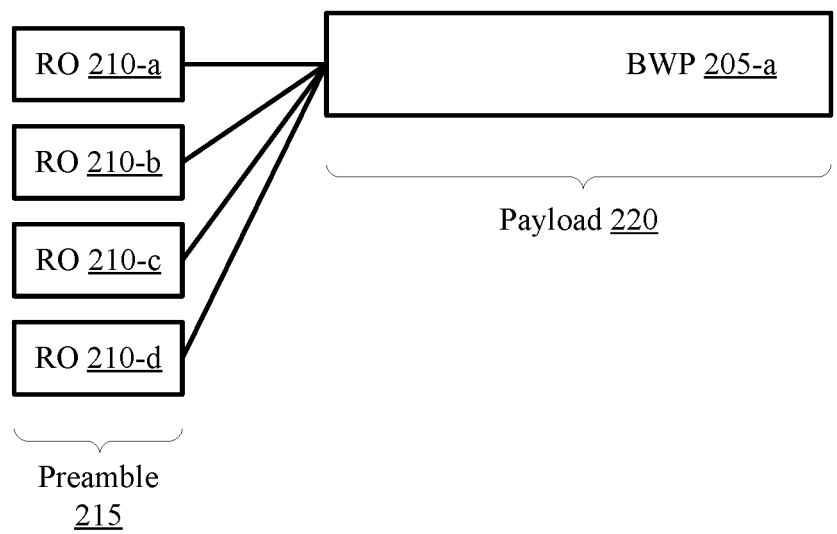

FIGS. 2A and 2B illustrate examples of a bandwidth part configuration 200 that supports bandwidth part configuration for reduced capability devices in accordance with one or more aspects of the present disclosure. In the descriptions of the bandwidth part configuration 200, the BWPs 205 may be initial UL BWPs used in associated with random access procedures for eRedCap devices and the ROs 210 may be random access occasions used for such random access procedures.

Some wireless communications network may employ the use of reduced capability (RedCap) or enhanced reduced capability (eRedCap) devices, which may operate with reduced capabilities such as reduced peak data throughput, latency, reliability, bandwidth, or other characteristics or capabilities. For example, some eRedCap devices may operate within a reduced bandwidth (e.g., 5 MHz). Such characteristics may limit a number of random access occasions that may be multiplexed (e.g., via FDM) and may lead to collisions during a random access procedure. For example, in some approaches, an initial UL BWP for eRedCap devices may contain one or two random access occasions with a 30 or 15 kHz subcarrier spacing (SCS) and a short sequence. Such approaches may lead to a limited number of allowed simultaneous random access occasions in the time domain (e.g., 64 random access occasions), which may lead to collisions.

In some approaches, eRedCap devices may use longer durations (for CORESETs or PDSCH messages) than durations used by other devices to attain similar coverage levels. Such operations or characteristics may also limit a number of eRedCap UEs whose paging occasions may be accommodated within an initial UL BWP for eRedCap devices. Some approaches may attempt to resolve such issues by employing TDM to offer additional random access occasions to eRedCap devices (which may result in increased overhead) or may use lengthened physical random access channel (PRACH) formats (which may result in an SCS that may be different that an SCSC used for data communications).

Therefore, to reduce or eliminate such limitations, a network entity may configure multiple initial BWPs (e.g., initial UL BWPs, initial DL BWPs, or both) for eRedCap devices and may further map multiple random access occasions (e.g., using FDM) to an initial UL BWP. Such approaches may offer increased capacity for eRedCap devices while reducing collisions during random access procedures.

As depicted in FIG. 2A, a network may configure multiple initial UL BWPs, such as BWP 205-*a*, 205-*b*, 205-*c*, and 205-*d* for eRedCap devices to multiplex random access loads. In some examples, each BWP 205 may contain a random access occasion (e.g., a RACH occasion (RO)), such as RO 210-*a*, RO 210-*b*, RO 210-*c*, and RO 210-*d*. For example, an RO 210 may be located within frequency resources that are located within a corresponding BWP 205. A UE may select one of the ROs 210 to use for performing a random access procedure (e.g., a RACH procedure), which may determine an effective initial UL BWP, an effective initial DL BWP, or both for the eRedCap UE to use for a random access procedure. For example, a eRedCap UE may select RO 210-*b* for communicating a random access preamble. By selecting RO 210-*b*, the UE, a network entity, or both, may determine that subsequent messaging (e.g., for a random access procedure, such as Msg2, Msg3, Msg4, or other RACH procedure signaling, other subsequent signaling, or any combination thereof) is to be performed within the BWP 205-*b* that corresponds to or contains the selected RO 210-*b*. In this way, capacity for serving multiple eRedCap devices may be increased and interference (e.g., collisions during a random access procedure) may be reduced or eliminated.

In the course of a random access procedure, transmission or reception of a random access preamble (e.g., Msg1 of a RACH procedure) may fail. In such cases, the eRedCap UE may employ one or more options for power control for retransmitting a failed random access preamble message. For example, the eRedCap UE may employ one or more power control parameters (e.g., a power ramping counter, such as a preamble transmission power ramping counter, a maximum power ramping parameter or value, such as a preamble transmission power maximum parameter or value, or any combination thereof) for retransmitting a failed random access preamble message.

In some examples, if a random access preamble transmission fails, a UE may select an RO 210 for retransmission of a failed random access preamble message. In such examples, the UE may select an RO from the same BWP 205 that was used during a prior transmission (e.g., during the failed transmission of the random access preamble) and the UE may increase or increment a preamble transmission power ramping counter based on such a selection. Additionally, or alternatively, the UE may select an RO from a different BWP 205 than the BWP 205 that was used during a prior transmission (e.g., during the failed transmission of the random access preamble) and the UE may refrain from increasing a preamble transmission power ramping counter based upon such a selection. Additionally, or alternatively, a UE may increment or increase a preamble transmission power ramping counter regardless of whether a selected RO 210 falls within a same BWP 205 that was used during a prior transmission (e.g., during the failed transmission of the random access preamble).

In some examples, the UE may be configured with one or more global power control parameters for preamble transmissions, one or more local parameters for preamble transmissions, or any combination thereof. For example, a UE may be configured with a global preamble transmission counter and preamble_transmission_max. The UE may select either a same or different BWP 205 used during a prior transmission (e.g., during the failed transmission of the random access preamble) for retransmission of a random access preamble message during a random access procedure. The UE may increment the global preamble_transmission_counter (e.g., using approaches described herein regarding selecting a same BWP 205 or a different BWP 205 than one used previously and incrementing or not incrementing based on such a selection) until the transmission of the preamble is successful or preamble_transmission_counter has a value that is equal to a value of preamble_transmission_max. Additionally, or alternatively, a UE may be configured with one or more local parameters, such a one or more instances of a preamble_transmission_counter, preamble_transmission_max, or any combination thereof. In some examples, such local parameters may be configured, incremented, adjusted, or otherwise utilized on a per-BWP basis. For example, a UE may have a preamble_transmission_counter, preamble_transmission_max, or both for one or more available BWPs (e.g., for one or more of BWP 205-*a*, BWP 205-*b*, BWP 205-*c*, and BWP 205-*d*). In some examples, a UE may select the same BWP 205 used during a prior transmission (e.g., during the failed transmission of the random access preamble) and may increment the preamble_transmission_counter (e.g., using approaches described herein regarding selecting a same BWP 205 or a different BWP 205 than one used previously and incrementing or not incrementing based on such a selection) for each retransmission until the transmission of the preamble is successful or preamble_transmission_counter for a BWP 205 has a value that is equal to a value of preamble_transmission_max for the same BWP 205.

As depicted in FIG. 2B, a network entity may configure a single BWP 205-*a* and multiple ROs 210 that may be associated with the BWP 205-*a* (e.g., to allow a greater number of ROs to be made available to eRedCap devices while maintaining a single initial UL BWP). In some examples, one or more of the ROs (e.g., RO 210-*a*) may be located in frequency resources that fall within the BWP 205-*a*, whereas other ROs (e.g., RO 210-*b*, RO 210-*c*, and RO 210-*d*) may be located in frequency resources that fall outside of the BWP 205-*a* but may still be associated with the BWP 205-*a*. In some such examples, a bandwidth of an RO 210 may be less than or equal to a bandwidth value used for an RO 210 that falls within the BWP 205-*a* (e.g., 5 MHz), but the overall bandwidth of the multiple ROs 210 may be wider or greater than a bandwidth associated with the BWP 205-*a*. A UE may select (e.g., regardless of whether a selected RO falls within the BWP 205 or not) any of the ROs 210 for communications such as transmission of a random access preamble or Msg1 of a RACH preamble. In some examples, subsequent messaging (e.g., Msg2, Msg3, Msg4, other messages, or any combination thereof) may be communicated within the BWP 205-*a*, whether the selected RO 210 falls within the BWP 205-*a* or not.

In some examples, parameters associated with the random access procedure or RACH procedure may be modified or new parameters may be used. For example, an offset parameter (e.g., msg1FrequencyStart associated with a RACH procedure) may be modified in implementations (e.g., the implementation depicted in FIG. 2B). Such an offset parameter may indicate an offset of a lowest random access transmission occasion (e.g., an RO 210) in the frequency domain with respect to a reference point or range (e.g., a physical resource block (PRB) such as PRB 0, that may be associated with the BWP 205-*a*). In some examples, such a parameter may be modified to remove a restriction that a random access resource is contained entirely within a bandwidth of a BWP, such as BWP 205-*a*. For example, an offset parameter (e.g., msg1FrequencyStart) may indicate that a lowest random access transmission occasion (e.g., an RO 210) may be partially or completely located outside a bandwidth of the BWP 205-*a*.

In some examples, a UE that selects an RO 210 that falls outside of the BWP 205-*a* (e.g., RO 210-*c*) may effectively be performing a BWP switch in a time domain (e.g., via TDD) between transmission of a random access preamble (e.g., RACH Msg1) and other random access procedure messaging (e.g., RACH procedure messaging such as Msg2, Msg3, Msg4, etc.). In some such situations, a network entity may configure or designate a period of time for switching between bandwidth parts at one or more points in a random access process (e.g., between a RACH Msg1 and Msg2, between a RACH Msg2 and Msg3, or at other places in a random access procedure). For example, a first group of UEs (such as UEs with a single phase-locked loop (PLL)) may utilize BWP switching time between transmitting a random access preamble (e.g., RACH Msg1) and receiving a subsequent random access message (e.g., RACH Msg2). Some approaches may include a gap that is greater than, less than, or equal to a designated time gap (e.g., a gap of one symbol). In another example, a second group of UEs may not utilize a time gap between transmitting a random access preamble (e.g., RACH Msg1) and receiving a subsequent random access message (e.g., RACH Msg2), but may utilize a time gap between transmission of a random access preamble (e.g., RACH Msg1) and transmitting a subsequent random access message (e.g., RACH Msg3). Additionally, or alternatively, the second group of UEs may utilize a time gap between receiving a random access message (e.g., RACH Msg2) and transmitting a subsequent random access message (e.g., RACH Msg3). Some approaches may include a gap that is greater than, less than, or equal a designated time gap or threshold. Though examples of gaps are discussed, the subject matter described herein contemplates such time gaps at any (or multiple) points (e.g., between any pairs of random access messages, whether they are sequential in time or not) during a random access procedure.

In some examples, the UE may transmit a random access preamble 215 during one of the ROs 210 (which may be located within the BWP 205-*a* or may be located outside of the BWP 205-*a*, which itself may be a shared initial UL BWP for eRedCap UEs), and may communicate a random access payload 220 within the BWP 205-*a*. In some examples, and as discussed herein, a time gap may be configured or designated between communication of the preamble 215 and the payload 220 to allow the UE to perform a BWP switch or one or more other RF retuning procedures. In some examples, if multiple preambles on the same RO 210 are mapped to the same PUSCH occasion, the same gap between (e.g., between a msgA preamble and a msgA payload) may be configured to promote consistency of timing advances. Additionally, or alternatively, if multiple initial UL BWPs are supported, repetition and inter-slot frequency hopping (e.g., of msgA preambles, payloads, or both) may be configured.

FIG. 3 illustrates an example of a bandwidth part configuration 300 that supports bandwidth part configuration for reduced capability devices in accordance with one or more aspects of the present disclosure. The bandwidth part configuration 300 may include or relate to a non-RedCap initial UL BWP 310, a non-RedCap initial DL BWP 315, an eRedCap initial DL BWP 320, one or more eRedCap initial UL BWPs 325 (including, as examples, eRedCap initial UL BWP 325-*a* and eRedCap initial UL BWP 325-*b*), one or more eRedCap initial DL BWPs 330 (including, as examples, eRedCap initial DL BWP 330-*a* and eRedCap initial DL BWP 330-*b*), or any combination thereof.

In some examples, a network entity may configure a non-RedCap initial UL BWP 310 and a non-RedCap initial DL BWP 315 for non-RedCap devices. The non-RedCap initial DL BWP 315 may include a synchronization signal block (SSB), such as a cell-defining SSB (CD-SSB), a control resource set (CORESET) such as CORESET0, or any combination thereof. Such parameters, values, or information may be used at least by non-RedCap UEs.

The network entity may configure an eRedCap initial DL BWP 320, which may include a modified SSB (e.g., a modified CD-SSB), a modified CORESET (e.g., a modified CORESET0), a system information block (SIB), paging information, or any combination thereof, that may be used by eRedCap UEs for random access procedures (e.g., a RACH procedure). For example, an SSB (e.g., the modified CD-SSB) may include a SIB that may include information about one or more initial UL BWPs, one or more initial DL BWPs, one or more ROs, or any combination thereof that a UE may utilize for a random access procedure. For example, the SSB may include information indicating one or more eRedCap initial UL BWPs 325 and one or more eRedCap initial DL BWPs 330. An eRedCap initial UL BWPs 325 may be configured to avoid fragmentation of uplink resources of non-eRedCap UEs. Further, an eRedCap initial DL BWP 330 may be configured to align a random access common search space (CSS) with an initial UL BWP (e.g., an eRedCap initial UL BWP 325).

In some examples, an initial DL BWP (e.g., an eRedCap initial DL BWP 330) may be tied to or associated with a paging location of a UE (e.g., based on the UE selecting an RO associated with an eRedCap initial UL BWP 325 that may be associated with an eRedCap initial DL BWP 330). In some examples, a UE may monitor paging during a random access procedure. In such cases, a UE may select the same eRedCap initial UL BWP 325 that is associated with the eRedCap initial DL BWP 330 that contains the UE's paging location. For example, if a paging location for the UE is located in eRedCap initial DL BWP 330-*a*, the UE may select the eRedCap initial UL BWP 325-*a* for a random access procedure (e.g., since the eRedCap initial DL BWP 330-*a* is associated with the initial UL BWP 325-*a*). However, if a UE is not monitoring paging during a random access procedure, the UE may select any eRedCap initial UL BWP 325 for the random access procedure (e.g., for transmitting or retransmitting a random access preamble).

Additionally, or alternatively, an eRedCap initial DL BWP 330 may be configured with a modified non cell-defining SSB (NCD-SSB), paging search spaces, or both, that a eRedCap UE may utilize (e.g., during or associated with a random access procedure). Additionally, or alternatively, a mapping between an identifier of a UE and an identifier of an initial BWP may be created or utilized for finding a paging occasion.

Figure 4A:
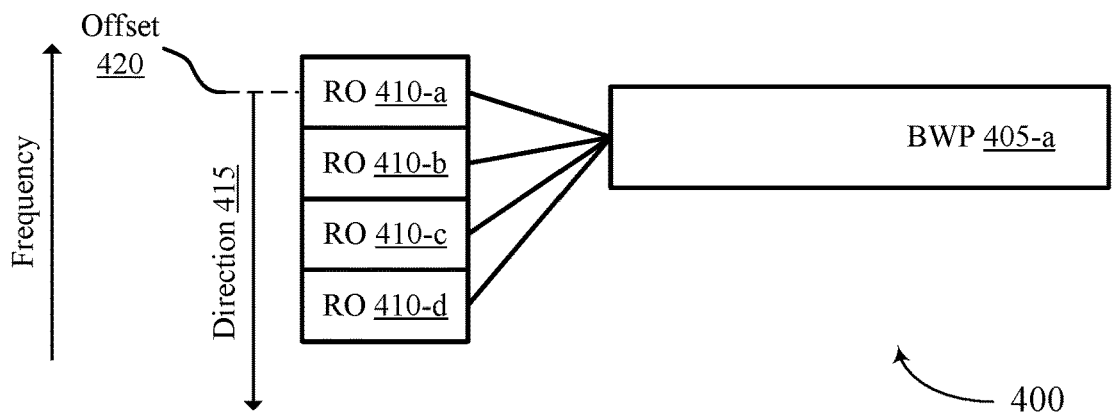
FIGS. 4A, 4B, and 4C illustrate examples of a bandwidth part configuration that supports bandwidth part configuration for reduced capability devices in accordance with one or more aspects of the present disclosure.
Figure 4B:
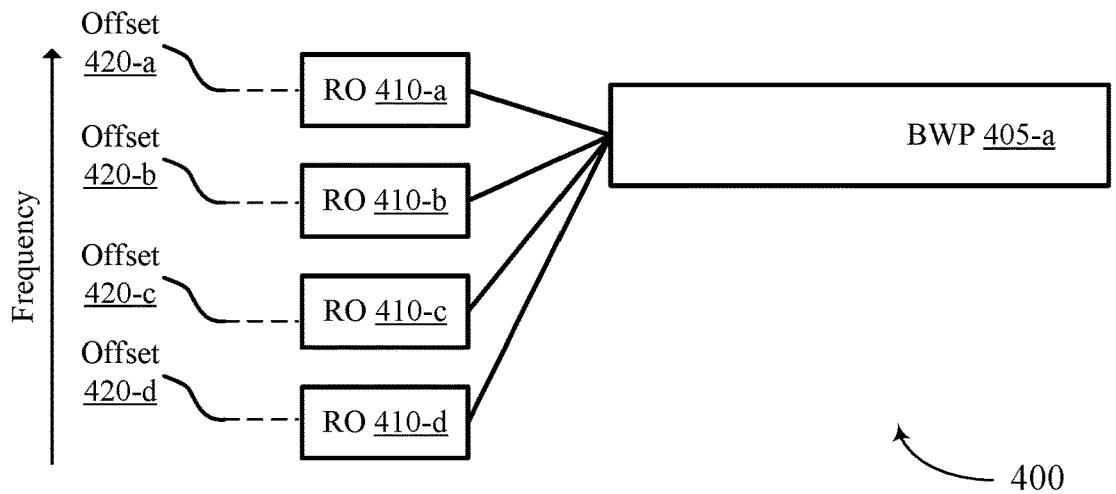
Figure 4C:
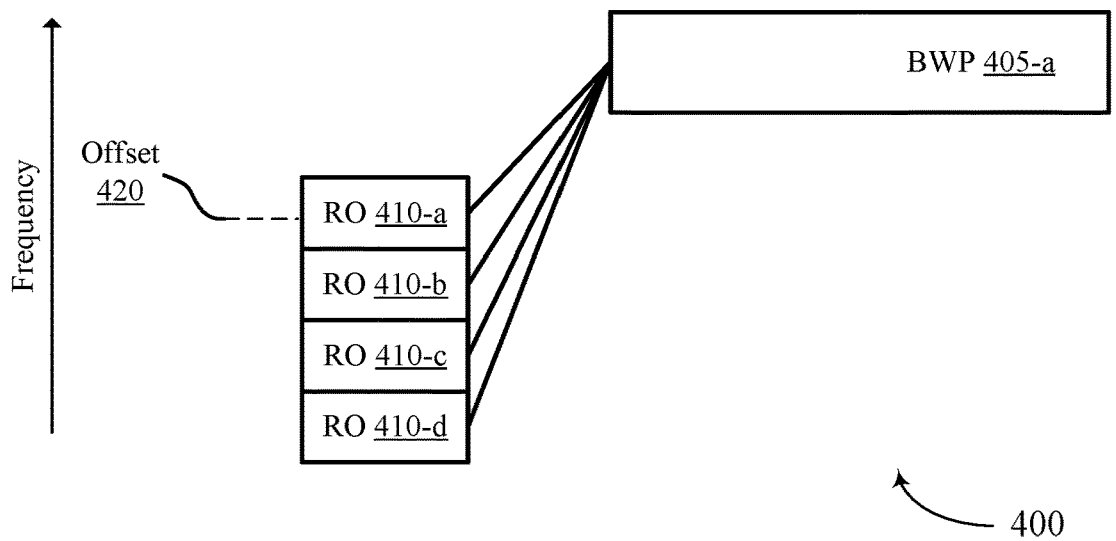

FIGS. 4A, 4B, and 4C illustrate examples of a bandwidth part configuration 400 that supports bandwidth part configuration for reduced capability devices in accordance with one or more aspects of the present disclosure.

Some approaches for random access procedures are limited in their allocation of random access occasions. For example, in some approaches, random access occasions are allocated in contiguous blocks and may extend in a single direction from a reference point (e.g., a PRB 0 of a BWP). In such approaches, an offset parameter (e.g., msg1-FrequencyStart) may indicate an offset between a random access occasion and the reference point, and other random access occasions may be indicated through another parameter (e.g., msg1-FDM). However, offsets of such random access occasions for a BWP may not be referred to relative to an absolute frequency position of a reference resource block (e.g., a parameter such as absoluteFrequencyPointA that may indicate an absolute frequency position of a reference resource block such as a common RB 0). However, such approaches may be improved.

As depicted in FIG. 4A, a binary direction parameter may be introduced. The direction parameter may indicate a direction 415 (e.g., in a frequency domain) that may indicate in which direction from a reference point (e.g., an RO indicated by an offset parameter which may indicate the offset 420) a contiguous block of ROs may be allocated. The direction parameter may be used in combination with other parameters (e.g., a multiplexing parameter, (e.g., msg1-FDM), an offset parameter (e.g., msg1-FrequencyStart, one or more other parameters, or any combination thereof) to determine or select multiple ROs that may be available to an eRedCap UE for use in connection with a random access procedure. The offset parameter may indicate an offset 420 from a reference point (e.g., PRB 0) of an initial UL BWP (e.g., BWP 405-a) to an RO 410 (e.g., RO 410-a, as depicted in FIG. 4A). The direction parameter may, based on the offset 420, then indicate the direction 415 (e.g., up or down in frequency) in which other ROs (e.g., ROs 410-b, 410-c, and 410-d) may be allocated. These other ROs may be indicated or defined by the multiplexing parameter (e.g., msg1-FDM).

Such approaches may provide for additional flexibility, in that the ROs 410 associated with the BWP 405-a may extend upwards or downwards in the frequency domain. Such ROs 410 may be allocated in a contiguous fashion, and in some examples, at least one RO 410 may be located in a positive offset (e.g., increasing in the frequency domain) from a reference point (e.g., PRB 0) of the BWP 405-a.

As depicted in FIG. 4B, multiple offset parameters may be provided that may indicate offsets 420 (e.g., including offset 420-a, offset 420-b, offset 420-c, and offset 420-d) for each of the ROs 410 on an individual or per-RO basis. For example, a network entity may configure multiple offset parameters (e.g., msg1-FrequencyStart-RO parameters) for some or all of the ROs 410 associated with the BWP 405-a. The offsets 420 indicates by the corresponding offset parameters may be positive or negative for each associated RO 410. In this way, the network entity may configure multiple ROs in different locations in the frequency domain, and may do so irrespective of a location in the frequency domain of the BWP 405-a.

As depicted in FIG. 4C, a new reference point (e.g., a Point A, as may be indicated in a parameter such as absoluteFrequencyPointA that may indicate an absolute frequency position of a reference resource block) for a first RO of the ROs 410 may be selected, indicated, or determined. Such a reference point may be used instead of another reference point (such as PRB 0 of the BWP 405-a), and an offset parameter may indicate an offset 420 from the reference point. In some examples, additional ROs, such as ROs 410-b, 410-c, and 410-d, may be determined or allocated based on the position of a first RO, such as RO 410-a (e.g., as described herein, such as in connection with a multiplexing parameter such as msg1-FDM). In such approaches, any RO 410 may be located in a positive or negative offset (relative to a point of or associated with the BWP 405-a, such as PRB 0) since a different reference point is used. Further, signaling overhead may be decreased as compared to other approaches.

Figure 5:
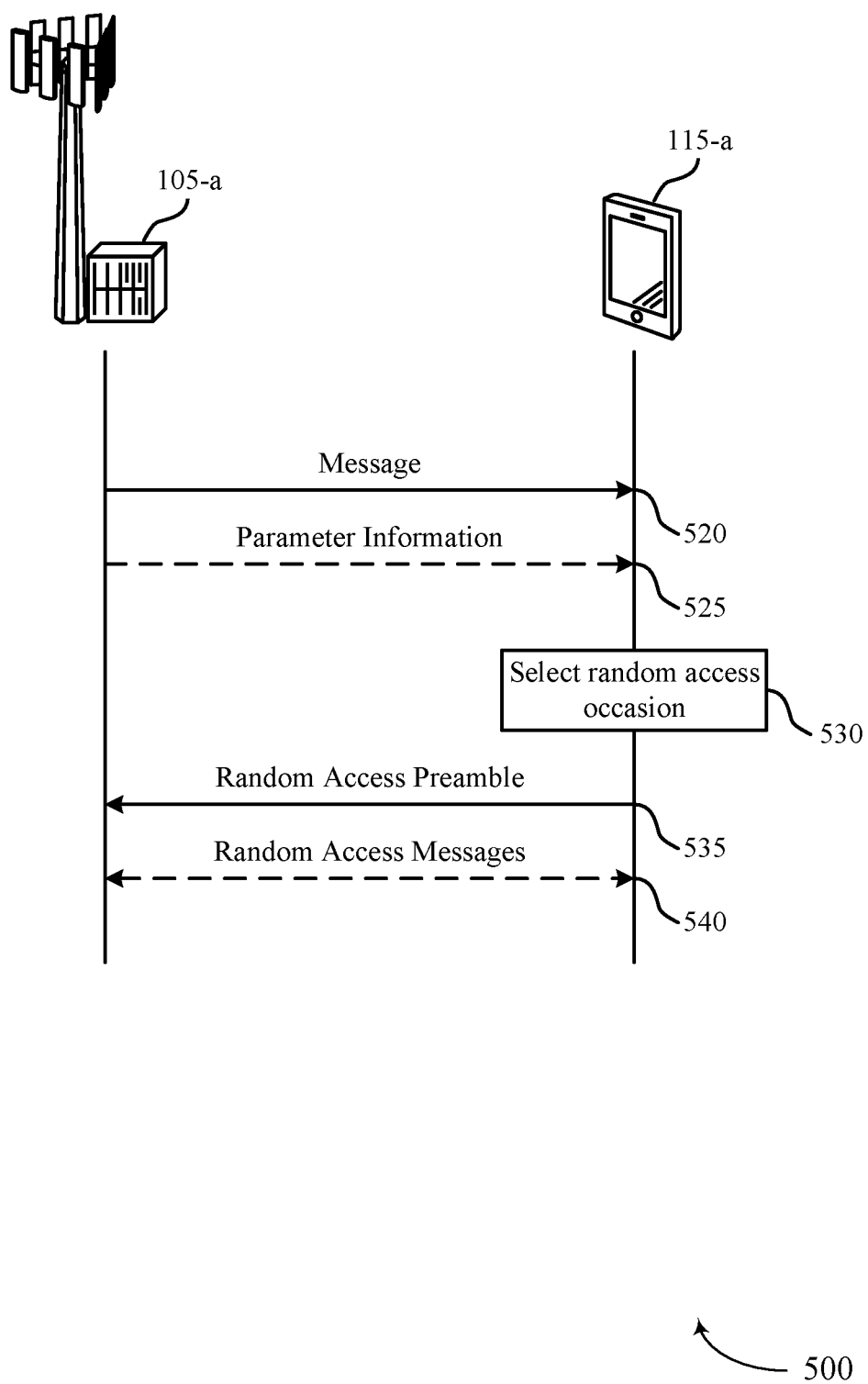
FIG. 5 illustrates an example of a process flow that supports bandwidth part configuration for reduced capability devices in accordance with one or more aspects of the present disclosure.

FIG. 5 illustrates an example of a process flow 500 that supports bandwidth part configuration for reduced capability devices in accordance with one or more aspects of the present disclosure.

The process flow 500 may implement various aspects of the present disclosure described herein. The network entity 105-a and the UE 115-a described in the process flow 500 may be examples of similarly-named elements described herein. In the following description of the process flow 500, the operations between the various entities or elements may be performed in different orders or at different times. Some operations may also be left out of the process flow 500, or other operations may be added. Although the various entities or elements are shown performing the operations of the process flow 500, some aspects of some operations may also be performed by other entities or elements of the process flow 500 or by entities or elements that are not depicted in the process flow, or any combination thereof.

At 520, the UE 115-a may receive a message that may indicate a first initial uplink bandwidth part for use by the UE in communications with a network entity, the message also optionally indicating a plurality of random access occasions, at least one of the plurality of random access occasions being in frequency resources that are outside of the first initial uplink bandwidth part. In some examples, receiving the message may include receiving an indication of one or more additional initial uplink bandwidth parts for use by the UE in the communications with the network entity, each of the plurality of random access occasions being in a respective one of the first initial uplink bandwidth part or additional initial uplink bandwidth parts. In some examples, at most one of the plurality of the random access occasions may be within the first initial uplink bandwidth part, a remainder of the plurality of the random access occasions being outside of the first initial uplink bandwidth part but still associated with the first initial uplink bandwidth part.

At 525, the UE 115-a may receive information that may be indicative of at least one of an offset parameter or a binary direction parameter and the binary direction parameter may indicate a direction in which the offset parameter may be applied with respect to a baseline resource block. In some examples, the UE 115-a may receive indications of at least one of the offset parameter or the binary direction parameter on a per-random access occasion basis. The UE 115-a may determine one or more of the frequency resources that may be outside of the first initial uplink bandwidth part based at least in part on the information. In some examples, determining the one or more of the frequency resources that may be outside of the first initial uplink bandwidth part may include determining, based at least in part on the offset parameter, the binary direction parameter, the baseline resource block, and a first frequency resource associated with a first random access occasion of the plurality of random access occasions and determining additional frequency resources associated with other random access occasions of the plurality of random access occasions, the additional frequency resources determined in relation to the first frequency resource.

At 530, the UE 115-a may select a random access occasion of the plurality of random access occasions for transmission of a random access preamble from the UE to the network entity. In some examples, the UE 115-a may monitor an initial downlink bandwidth part for paging occasions during the random access procedure. The UE 115-*a* may identify, from the first initial uplink bandwidth part and the additional initial uplink bandwidth parts, a corresponding initial uplink bandwidth part that corresponds to the initial downlink bandwidth part. The UE 115-*a* may further select the random access occasion that may be within the corresponding initial uplink bandwidth part based at least in part on the corresponding initial uplink bandwidth part corresponding to the initial downlink bandwidth part.

At 535, the UE 115-*a* may transmit, as part of a random access procedure, the random access preamble within the random access occasion. In some examples, the UE 115-*a* may determine that transmission of the random access preamble failed and that the random access preamble was transmitted within a first attempted initial uplink bandwidth part selected from the first initial uplink bandwidth part and the additional initial uplink bandwidth parts. The UE 115-*a* may increment a preamble power ramping parameter based at least in part on failure of the transmission of the random access preamble and on whether the first attempted initial uplink bandwidth part is to be reused for retransmission of the random access preamble. Additionally, or alternatively, the UE 115-*a* may increment a preamble power ramping parameter based at least in part on failure of the transmission of the random access preamble, regardless of whether the first attempted initial uplink bandwidth part is to be reused for retransmission of the random access preamble.

The UE 115-*a* may retransmit the random access preamble in accordance with the preamble power ramping parameter. Additionally, or alternatively, the UE 115-*a* may retransmit the random access preamble via the first attempted initial uplink bandwidth part and the retransmitting may be in accordance with a maximum number of retransmissions parameter that applies to retransmissions per initial uplink bandwidth part.

In some examples, the UE 115-*a* may determine that transmission of the random access preamble failed and may further retransmit the random access preamble via any of the first initial uplink bandwidth part or the additional initial uplink bandwidth parts and the retransmitting may be in accordance with a maximum number of retransmissions parameter that applies to retransmissions across all of the first initial uplink bandwidth part and the additional initial uplink bandwidth parts, collectively.

At 540, the UE 115-*a* may communicate additional one or more random access messages that may be associated with transmission of the random access preamble, the one or more random access messages being communicated in frequency resources that may be within a same one of the first initial uplink bandwidth part or the additional initial uplink bandwidth parts in which the random access preamble may be transmitted.

Additionally, or alternatively, the UE 115-*a* may communicate additional one or more random access messages that may be associated with transmission of the random access preamble, the one or more random access messages being communicated in frequency resources that may be within a selected initial uplink bandwidth part that corresponds to the random access occasion. In some examples, communicating the additional one or more random access messages may include receiving a random access response message separated in time from transmission of the random access preamble by a duration of time that includes a bandwidth part switching time gap. In some examples, communicating the additional one or more random access messages may include transmitting transmit a connection request message separated in time from transmission of the random access preamble by a duration of time that includes a bandwidth part switching time gap. In some examples, communicating the additional one or more random access messages may include transmitting a random access request payload separated in time from transmission of the random access preamble by a duration of time that includes a bandwidth part switching time gap, the random access procedure being a two-step random access procedure.

Figure 6:
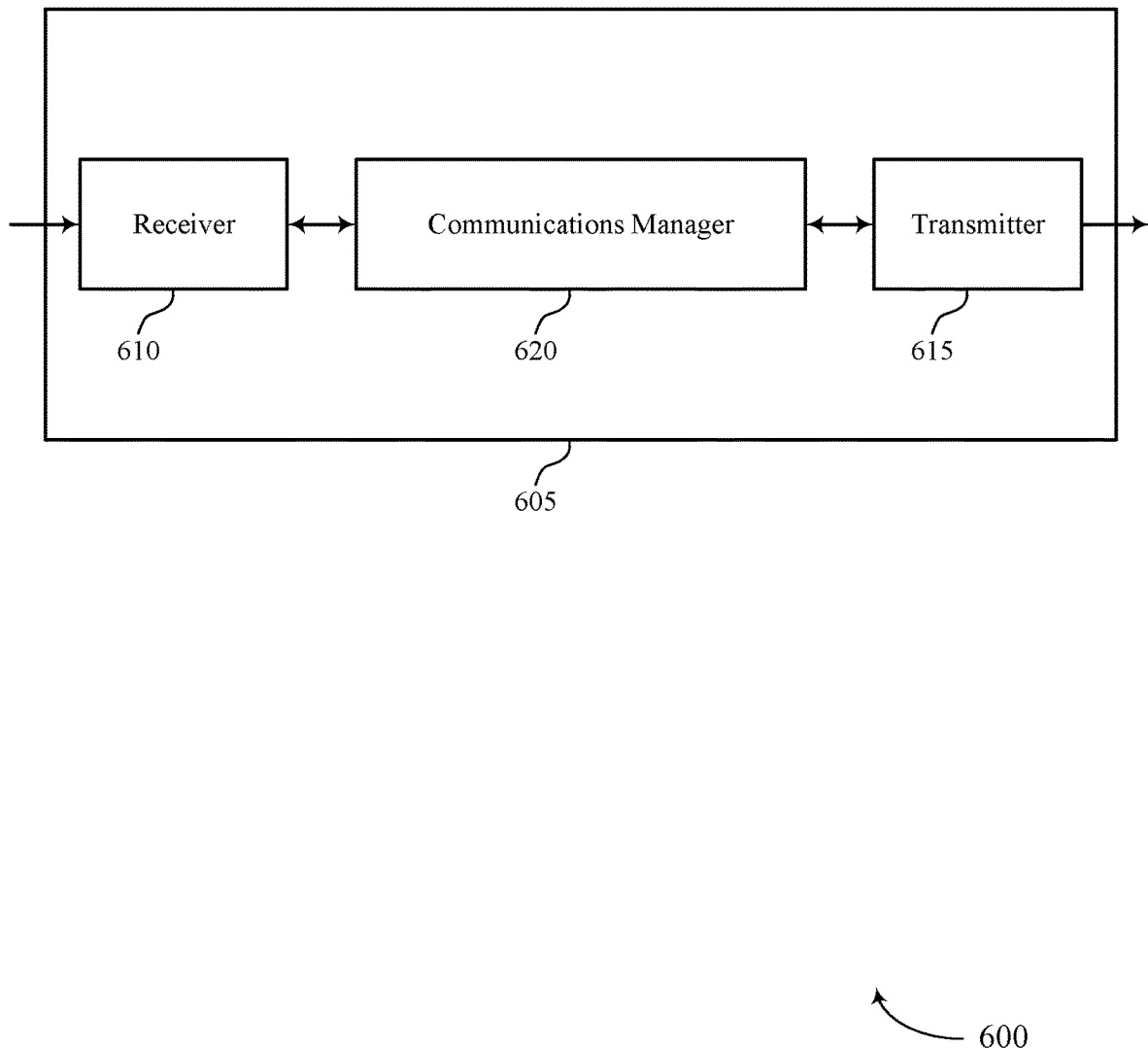
FIGS. 6 and 7 show block diagrams of devices that support bandwidth part configuration for reduced capability devices in accordance with one or more aspects of the present disclosure.

FIG. 6 shows a block diagram 600 of a device 605 that supports bandwidth part configuration for reduced capability devices in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to bandwidth part configuration for reduced capability devices). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to bandwidth part configuration for reduced capability devices). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of bandwidth part configuration for reduced capability devices as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software) executed by a processor. If implemented in code executed by a processor, the functions of the communications manager 620, the receiver 610, the transmitter 615, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

Additionally, or alternatively, the communications manager 620 may support wireless communications at a UE in accordance with examples as disclosed herein. For example, the communications manager 620 may be configured as or otherwise support a means for receiving a message that indicates a first initial uplink bandwidth part for use by the UE in communications with a network entity, the message also indicating a set of multiple random access occasions, at least one of the set of multiple random access occasions being in frequency resources that are outside of the first initial uplink bandwidth part. The communications manager 620 may be configured as or otherwise support a means for selecting a random access occasion of the set of multiple random access occasions for transmission of a random access preamble from the UE to the network entity. The communications manager 620 may be configured as or otherwise support a means for transmitting, as part of a random access procedure, the random access preamble within the random access occasion.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, more efficient utilization of communication resources, or any combination thereof.

Figure 7:
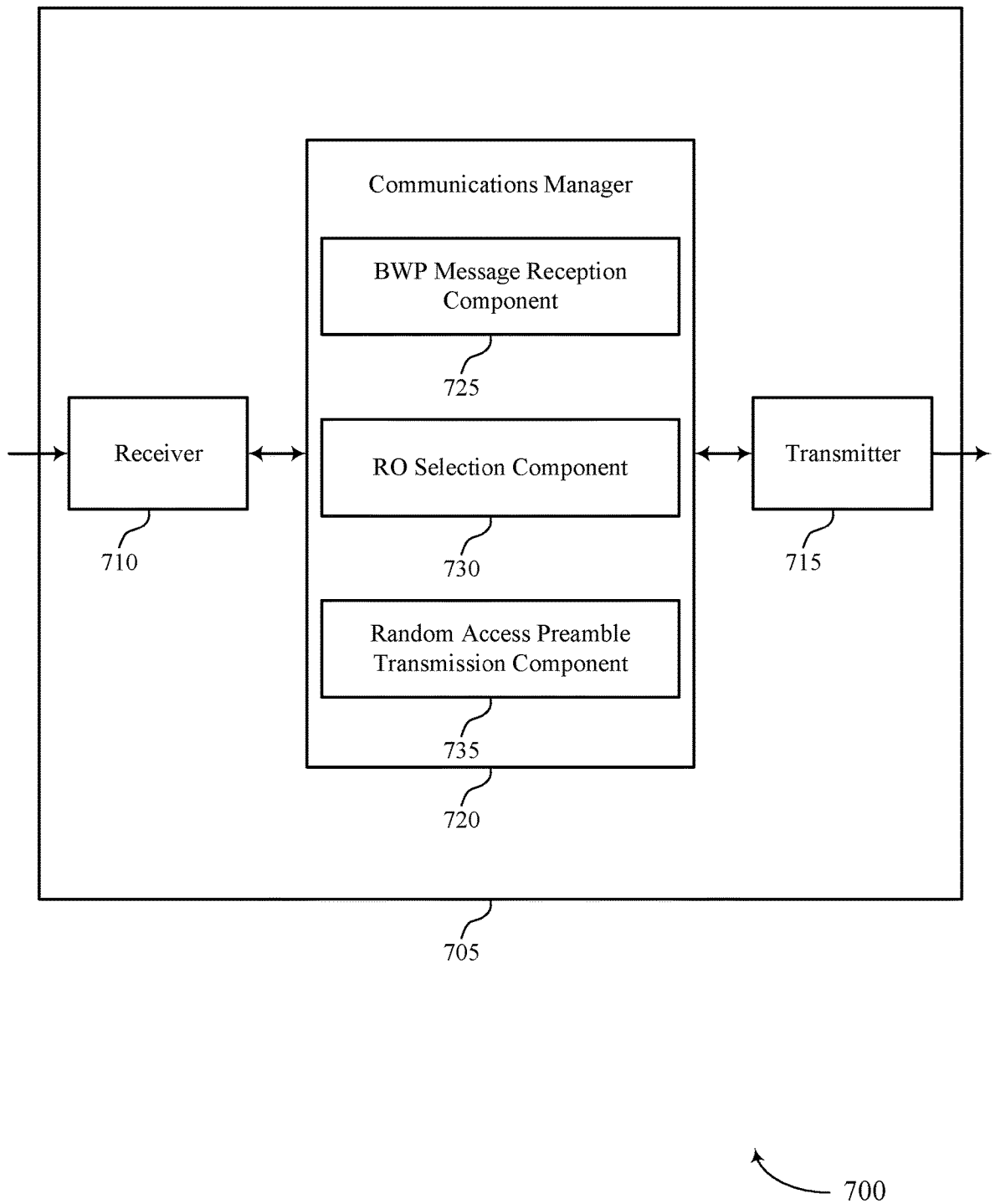

FIG. 7 shows a block diagram 700 of a device 705 that supports bandwidth part configuration for reduced capability devices in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to bandwidth part configuration for reduced capability devices). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to bandwidth part configuration for reduced capability devices). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of bandwidth part configuration for reduced capability devices as described herein. For example, the communications manager 720 may include a BWP message reception component 725, a RO selection component 730, a random access preamble transmission component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The BWP message reception component 725 may be configured as or otherwise support a means for receiving a message that indicates a first initial uplink bandwidth part for use by the UE in communications with a network entity, the message also indicating a set of multiple random access occasions, at least one of the set of multiple random access occasions being in frequency resources that are outside of the first initial uplink bandwidth part. The RO selection component 730 may be configured as or otherwise support a means for selecting a random access occasion of the set of multiple random access occasions for transmission of a random access preamble from the UE to the network entity. The random access preamble transmission component 735 may be configured as or otherwise support a means for transmitting, as part of a random access procedure, the random access preamble within the random access occasion.

Figure 8:
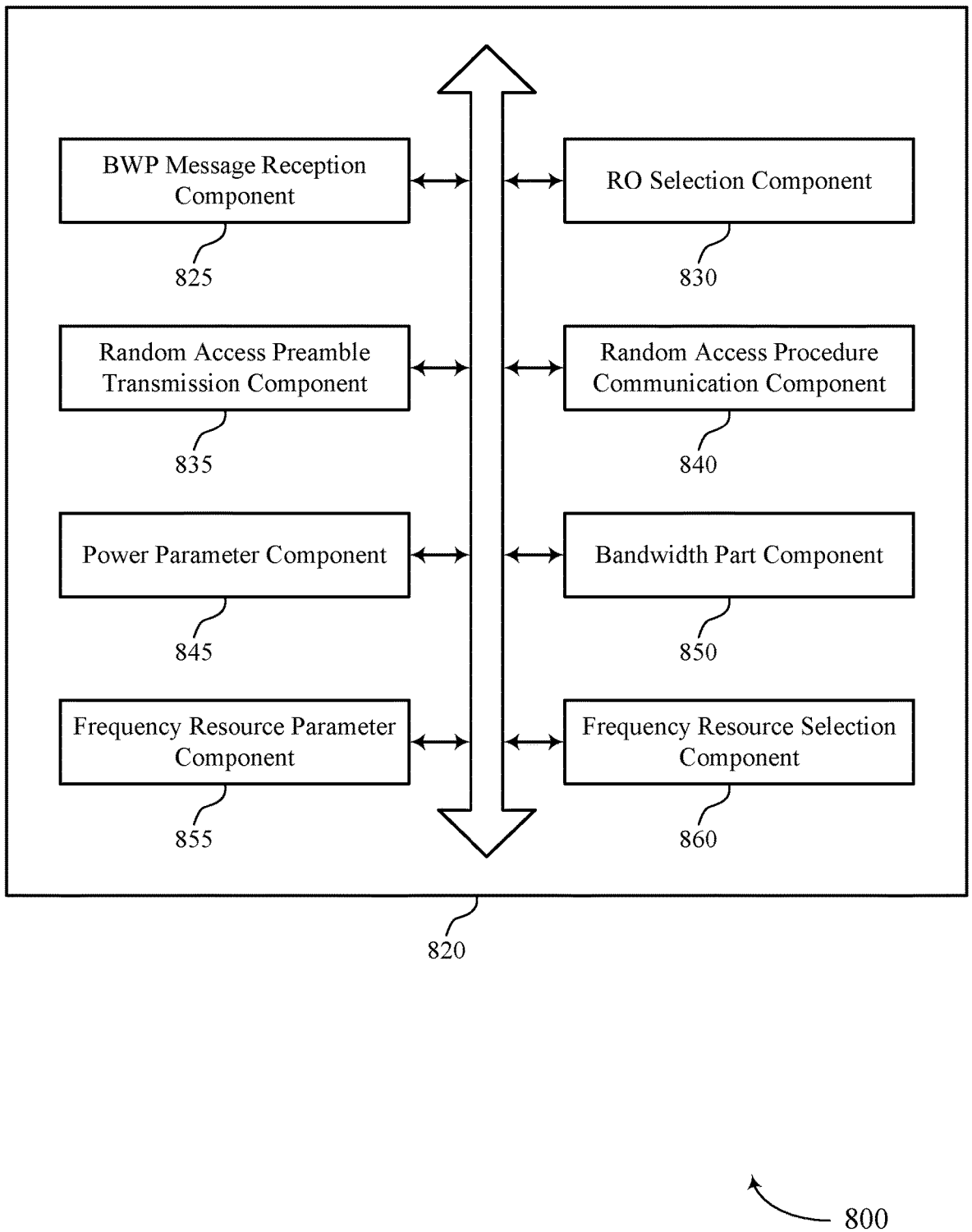
FIG. 8 shows a block diagram of a communications manager that supports bandwidth part configuration for reduced capability devices in accordance with one or more aspects of the present disclosure.

FIG. 8 shows a block diagram 800 of a communications manager 820 that supports bandwidth part configuration for reduced capability devices in accordance with one or more aspects of the present disclosure. The communications manager 820 may be an example of aspects of a communications manager 620, a communications manager 720, or both, as described herein. The communications manager 820, or various components thereof, may be an example of means for performing various aspects of bandwidth part configuration for reduced capability devices as described herein. For example, the communications manager 820 may include a BWP message reception component 825, a RO selection component 830, a random access preamble transmission component 835, a random access procedure communication component 840, a power parameter component 845, a bandwidth part component 850, a frequency resource parameter component 855, a frequency resource selection component 860, or any combination thereof. Each of these components may communicate, directly or indirectly, with one another (e.g., via one or more buses).

Additionally, or alternatively, the communications manager 820 may support wireless communications at a UE in accordance with examples as disclosed herein. The BWP message reception component 825 may be configured as or otherwise support a means for receiving a message that indicates a first initial uplink bandwidth part for use by the UE in communications with a network entity, the message also indicating a set of multiple random access occasions, at least one of the set of multiple random access occasions being in frequency resources that are outside of the first initial uplink bandwidth part. The RO selection component 830 may be configured as or otherwise support a means for selecting a random access occasion of the set of multiple random access occasions for transmission of a random access preamble from the UE to the network entity. The random access preamble transmission component 835 may be configured as or otherwise support a means for transmitting, as part of a random access procedure, the random access preamble within the random access occasion.

In some examples, to support receiving the message, the BWP message reception component 825 may be configured as or otherwise support a means for receiving an indication of one or more additional initial uplink bandwidth parts for use by the UE in the communications with the network entity, each of the set of multiple random access occasions being in a respective one of the first initial uplink bandwidth part or additional initial uplink bandwidth parts.

In some examples, the random access procedure communication component 840 may be configured as or otherwise support a means for communicating additional one or more random access messages that are associated with transmission of the random access preamble, the one or more random access messages being communicated in frequency resources that are within a same one of the first initial uplink bandwidth part or the additional initial uplink bandwidth parts in which the random access preamble is transmitted.

In some examples, the random access preamble transmission component 835 may be configured as or otherwise support a means for determining that transmission of the random access preamble failed, where the random access preamble was transmitted within a first attempted initial uplink bandwidth part selected from the first initial uplink bandwidth part and the additional initial uplink bandwidth parts. In some examples, the power parameter component 845 may be configured as or otherwise support a means for incrementing a preamble power ramping parameter based on failure of the transmission of the random access preamble and on whether the first attempted initial uplink bandwidth part is to be reused for retransmission of the random access preamble. In some examples, the random access preamble transmission component 835 may be configured as or otherwise support a means for retransmitting the random access preamble in accordance with the preamble power ramping parameter.

In some examples, the random access preamble transmission component 835 may be configured as or otherwise support a means for determining that transmission of the random access preamble failed, where the random access preamble was transmitted within a first attempted initial uplink bandwidth part selected from the first initial uplink bandwidth part and the additional initial uplink bandwidth parts. In some examples, the power parameter component 845 may be configured as or otherwise support a means for incrementing a preamble power ramping parameter based on failure of the transmission of the random access preamble, regardless of whether the first attempted initial uplink bandwidth part is to be reused for retransmission of the random access preamble. In some examples, the random access preamble transmission component 835 may be configured as or otherwise support a means for retransmitting the random access preamble in accordance with the preamble power ramping parameter.

In some examples, the random access preamble transmission component 835 may be configured as or otherwise support a means for determining that transmission of the random access preamble failed. In some examples, the random access preamble transmission component 835 may be configured as or otherwise support a means for retransmitting the random access preamble via any of the first initial uplink bandwidth part or the additional initial uplink bandwidth parts, where the retransmitting is in accordance with a maximum number of retransmissions parameter that applies to retransmissions across all of the first initial uplink bandwidth part and the additional initial uplink bandwidth parts, collectively.

In some examples, the random access preamble transmission component 835 may be configured as or otherwise support a means for determining that transmission of the random access preamble failed, where the random access preamble was transmitted within a first attempted initial uplink bandwidth part selected from the first initial uplink bandwidth part and the additional initial uplink bandwidth parts. In some examples, the random access preamble transmission component 835 may be configured as or otherwise support a means for retransmitting the random access preamble via the first attempted initial uplink bandwidth part, where the retransmitting is in accordance with a maximum number of retransmissions parameter that applies to retransmissions per initial uplink bandwidth part.

In some examples, to support selecting the random access occasion, the bandwidth part component 850 may be configured as or otherwise support a means for monitoring an initial downlink bandwidth part for paging occasions during the random access procedure. In some examples, to support selecting the random access occasion, the bandwidth part component 850 may be configured as or otherwise support a means for identifying, from the first initial uplink bandwidth part and the additional initial uplink bandwidth parts, a corresponding initial uplink bandwidth part that corresponds to the initial downlink bandwidth part. In some examples, to support selecting the random access occasion, the bandwidth part component 850 may be configured as or otherwise support a means for selecting the random access occasion that is within the corresponding initial uplink bandwidth part based on the corresponding initial uplink bandwidth part corresponding to the initial downlink bandwidth part.

In some examples, at most one of the set of multiple the random access occasions is within the first initial uplink bandwidth part, a remainder of the set of multiple the random access occasions being outside of the first initial uplink bandwidth part but still associated with the first initial uplink bandwidth part.

In some examples, the frequency resource parameter component 855 may be configured as or otherwise support a means for receiving information that is indicative of at least one of an offset parameter or a binary direction parameter, where the binary direction parameter indicates a direction in which the offset parameter is to be applied with respect to a baseline resource block. In some examples, the frequency resource selection component 860 may be configured as or otherwise support a means for determining one or more of the frequency resources that are outside of the first initial uplink bandwidth part based on the information.

In some examples, to support receiving the information that is indicative of at least one of the offset parameter or the binary direction parameter, the frequency resource selection component 860 may be configured as or otherwise support a means for receiving indications of at least one of the offset parameter or the binary direction parameter on a per-random access occasion basis.

In some examples, to support determining one or more of the frequency resources that are outside of the first initial uplink bandwidth part, the frequency resource parameter component 855 may be configured as or otherwise support a means for determining, based on the offset parameter, the binary direction parameter, the baseline resource block, and a first frequency resource associated with a first random access occasion of the set of multiple random access occasions. In some examples, to support determining one or more of the frequency resources that are outside of the first initial uplink bandwidth part, the frequency resource selection component 860 may be configured as or otherwise support a means for determining additional frequency resources associated with other random access occasions of the set of multiple random access occasions, the additional frequency resources determined in relation to the first frequency resource.

In some examples, the random access procedure communication component 840 may be configured as or otherwise support a means for communicating additional one or more random access messages that are associated with transmission of the random access preamble, the one or more random access messages being communicated in frequency resources that are within a selected initial uplink bandwidth part that corresponds to the random access occasion.

In some examples, to support communicating the additional one or more random access messages, the random access procedure communication component 840 may be configured as or otherwise support a means for receiving a random access response message separated in time from transmission of the random access preamble by a duration of time that includes a bandwidth part switching time gap.

In some examples, to support communicating the additional one or more random access messages, the random access procedure communication component 840 may be configured as or otherwise support a means for transmitting a connection request message separated in time from transmission of the random access preamble by a duration of time that includes a bandwidth part switching time gap.

In some examples, to support communicating the additional one or more random access messages, the random access procedure communication component 840 may be configured as or otherwise support a means for transmitting a random access request payload separated in time from transmission of the random access preamble by a duration of time that includes a bandwidth part switching time gap, the random access procedure being a two-step random access procedure.

In some examples, the message is received through a system information block, a synchronization signal block, downlink control information, a medium access control control element, radio resource control signaling, a handover command, or any combination thereof.

Figure 9:
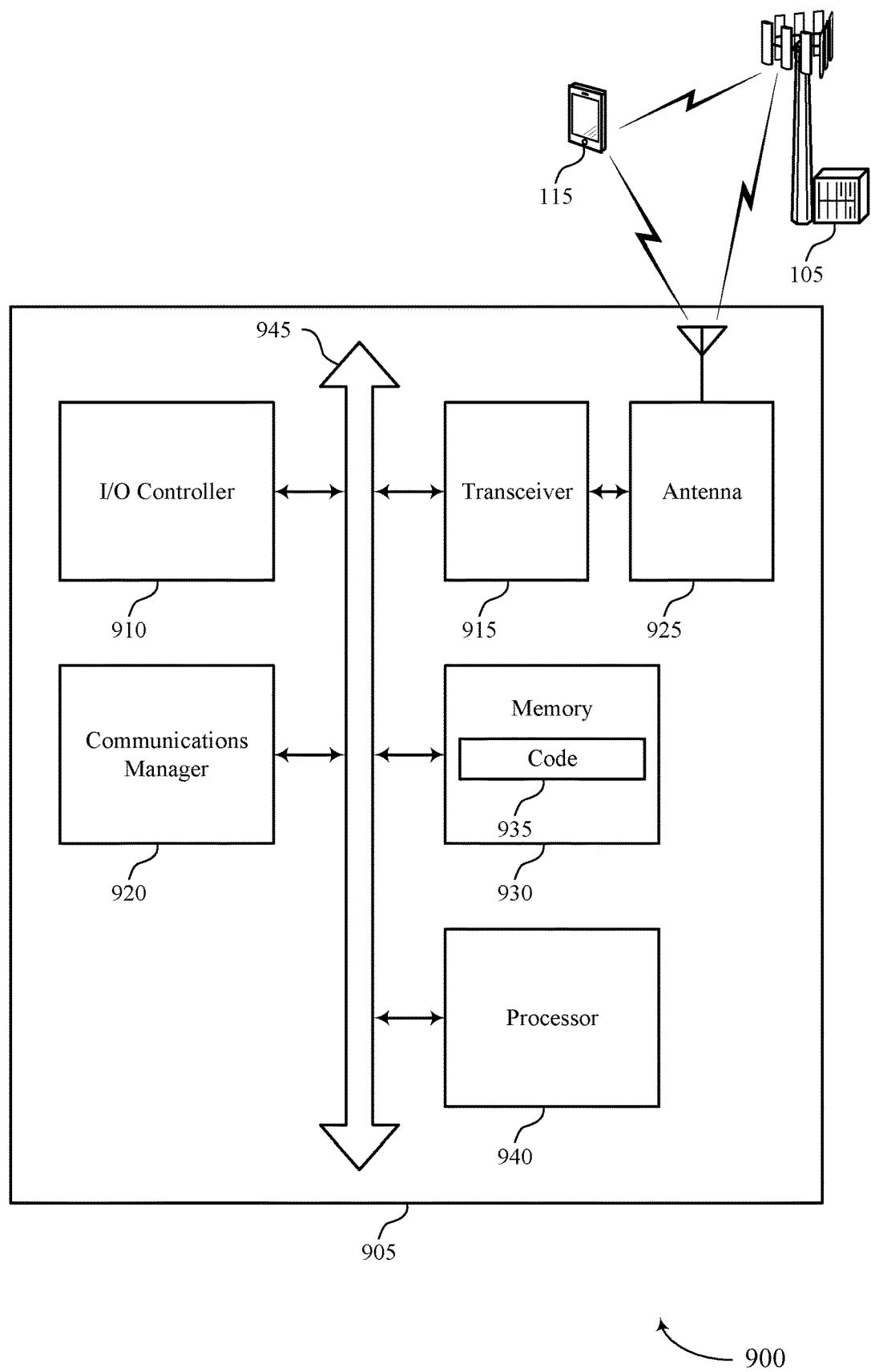
FIG. 9 shows a diagram of a system including a device that supports bandwidth part configuration for reduced capability devices in accordance with one or more aspects of the present disclosure.

FIG. 9 shows a diagram of a system 900 including a device 905 that supports bandwidth part configuration for reduced capability devices in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting bandwidth part configuration for reduced capability devices). For example, the device 905 or a component of the device 905 may include a processor 940 and memory 930 coupled with or to the processor 940, the processor 940 and memory 930 configured to perform various functions described herein.

Additionally, or alternatively, the communications manager 920 may support wireless communications at a UE in accordance with examples as disclosed herein. For example, the communications manager 920 may be configured as or otherwise support a means for receiving a message that indicates a first initial uplink bandwidth part for use by the UE in communications with a network entity, the message also indicating a set of multiple random access occasions, at least one of the set of multiple random access occasions being in frequency resources that are outside of the first initial uplink bandwidth part. The communications manager 920 may be configured as or otherwise support a means for selecting a random access occasion of the set of multiple random access occasions for transmission of a random access preamble from the UE to the network entity. The communications manager 920 may be configured as or otherwise support a means for transmitting, as part of a random access procedure, the random access preamble within the random access occasion.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of bandwidth part configuration for reduced capability devices as described herein, or the processor 940 and the memory 930 may be otherwise configured to perform or support such operations.

Figure 10:
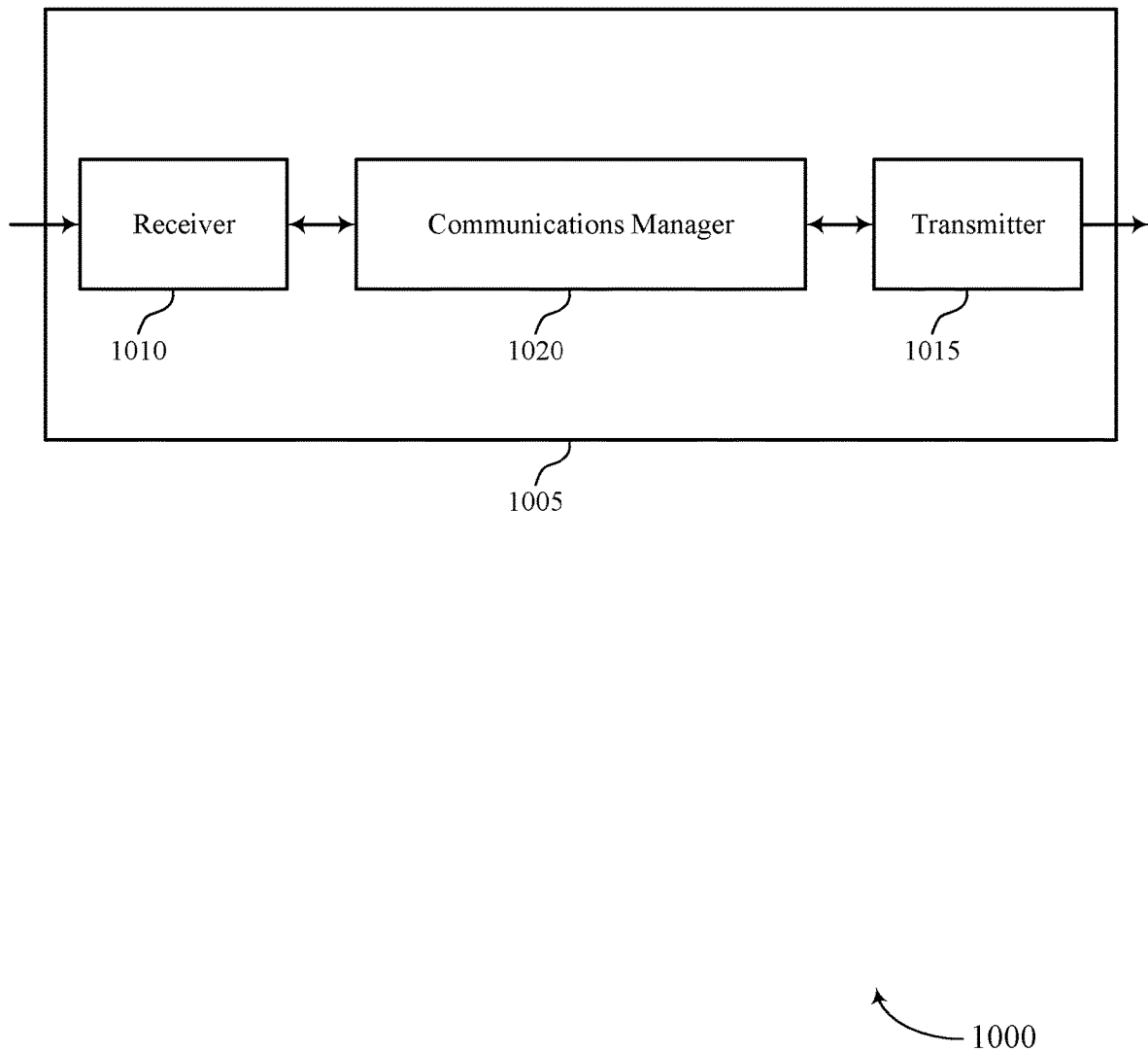
FIGS. 10 and 11 show block diagrams of devices that support bandwidth part configuration for reduced capability devices in accordance with one or more aspects of the present disclosure.

FIG. 10 shows a block diagram 1000 of a device 1005 that supports bandwidth part configuration for reduced capability devices in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of bandwidth part configuration for reduced capability devices as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software) executed by a processor. If implemented in code executed by a processor, the functions of the communications manager 1020, the receiver 1010, the transmitter 1015, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

Additionally, or alternatively, the communications manager 1020 may support wireless communications at a network entity in accordance with examples as disclosed herein. For example, the communications manager 1020 may be configured as or otherwise support a means for transmitting a message that indicates a first initial uplink bandwidth part for use by a UE in communications with a network entity, the message also indicating a set of multiple random access occasions, at least one of the set of multiple random access occasions being in frequency resources that are outside of the first initial uplink bandwidth part. The communications manager 1020 may be configured as or otherwise support a means for receiving, as part of a random access procedure, a random access preamble within a random access occasion selected from the plurality of random access occasions.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing, reduced power consumption, more efficient utilization of communication resources, or any combination thereof.

Figure 11:
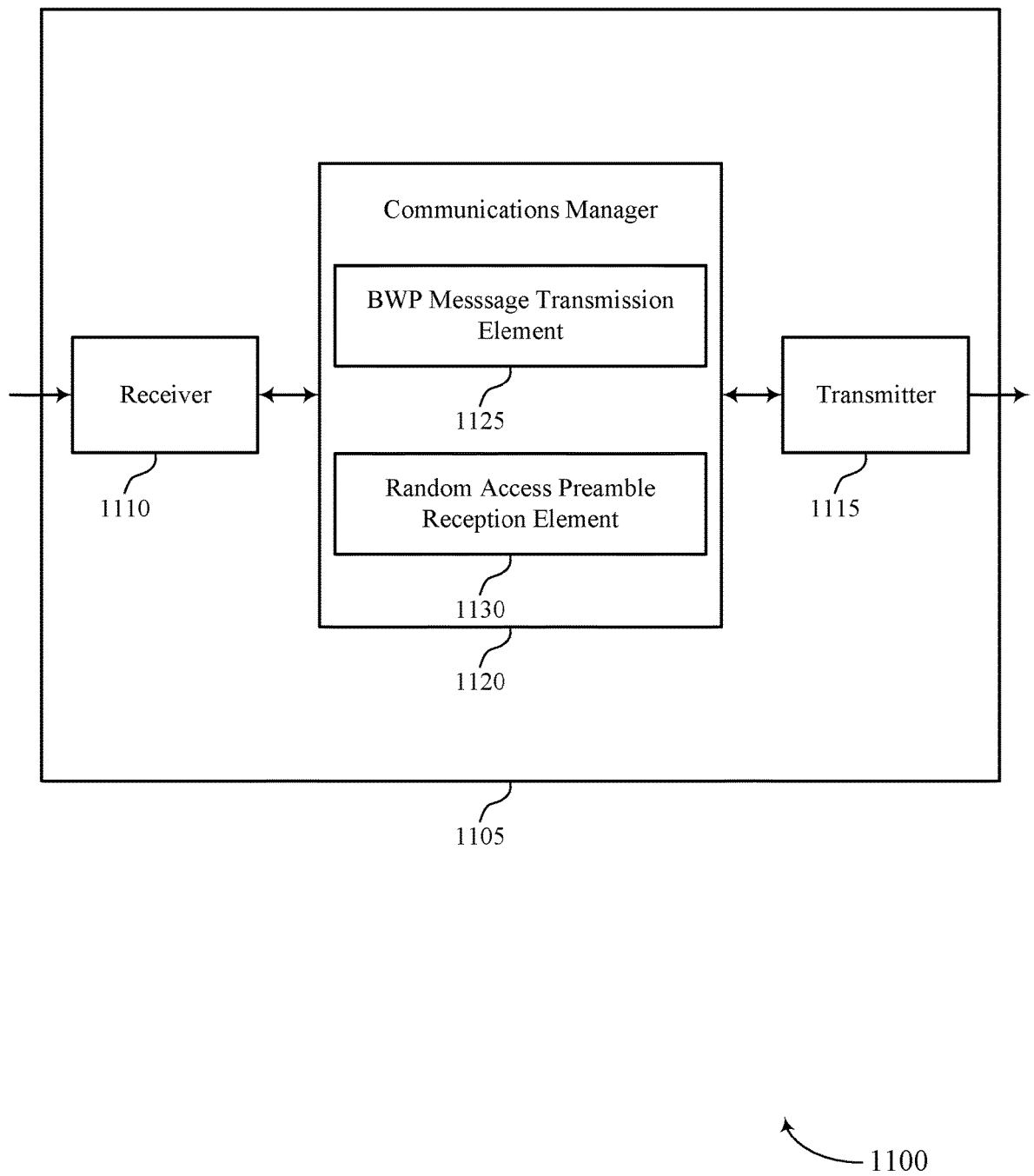

FIG. 11 shows a block diagram 1100 of a device 1105 that supports bandwidth part configuration for reduced capability devices in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of bandwidth part configuration for reduced capability devices as described herein. For example, the communications manager 1120 may include a BWP message transmission element 1125 a random access preamble reception element 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The BWP message transmission element 1125 may be configured as or otherwise support a means for transmitting a message that indicates a first initial uplink bandwidth part for use by a UE in communications with a network entity, the message also indicating a set of multiple random access occasions, at least one of the set of multiple random access occasions being in frequency resources that are outside of the first initial uplink bandwidth part. The random access preamble reception element 1130 may be configured as or otherwise support a means for receiving, as part of a random access procedure, a random access preamble within a random access occasion selected from the plurality of random access occasions.

Figure 12:
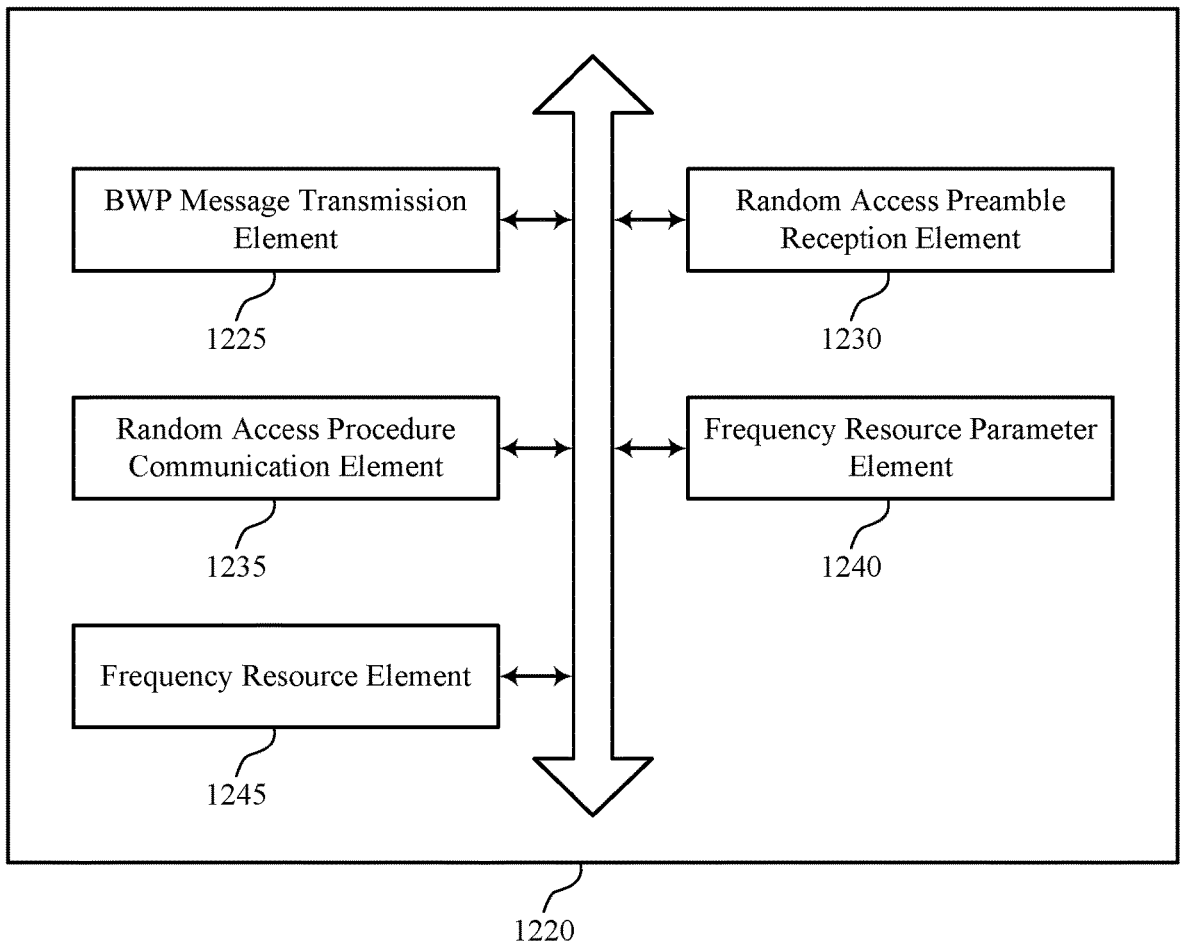
FIG. 12 shows a block diagram of a communications manager that supports bandwidth part configuration for reduced capability devices in accordance with one or more aspects of the present disclosure.

FIG. 12 shows a block diagram 1200 of a communications manager 1220 that supports bandwidth part configuration for reduced capability devices in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of bandwidth part configuration for reduced capability devices as described herein. For example, the communications manager 1220 may include a BWP message transmission element 1225, a random access preamble reception element 1230, a random access procedure communication element 1235, a frequency resource parameter element 1240, a frequency resource element 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

Additionally, or alternatively, the communications manager 1220 may support wireless communications at a network entity in accordance with examples as disclosed herein. The BWP message transmission element 1225 may be configured as or otherwise support a means for transmitting a message that indicates a first initial uplink bandwidth part for use by a UE in communications with a network entity, the message also indicating a set of multiple random access occasions, at least one of the set of multiple random access occasions being in frequency resources that are outside of the first initial uplink bandwidth part. The random access preamble reception element 1230 may be configured as or otherwise support a means for receiving, as part of a random access procedure, a random access preamble within a random access occasion selected from the plurality of random access occasions.

In some examples, to support receiving the message, the BWP message transmission element 1225 may be configured as or otherwise support a means for transmitting an indication of one or more additional initial uplink bandwidth parts for use by a UE in the communications with the network entity, each of the set of multiple random access occasions being in a respective one of the first initial uplink bandwidth part or additional initial uplink bandwidth parts.

In some examples, the random access procedure communication element 1235 may be configured as or otherwise support a means for communicating additional one or more random access messages that are associated with transmission of the random access preamble, the one or more random access messages being communicated in frequency resources that are within a same one of the first initial uplink bandwidth part or the additional initial uplink bandwidth parts in which the random access preamble is transmitted.

In some examples, the random access preamble reception element 1230 may be configured as or otherwise support a means for determining that transmission of the random access preamble failed. In some examples, the random access preamble reception element 1230 may be configured as or otherwise support a means for receiving a retransmission of the random access preamble via any of the first initial uplink bandwidth part or the additional initial uplink bandwidth parts, where the retransmitting is in accordance with a maximum number of retransmissions parameter that applies to retransmissions across all of the first initial uplink bandwidth part and the additional initial uplink bandwidth parts, collectively.

In some examples, at most one of the set of multiple the random access occasions is within the first initial uplink bandwidth part, a remainder of the set of multiple the random access occasions being outside of the first initial uplink bandwidth part but still associated with the first initial uplink bandwidth part.

In some examples, the frequency resource parameter element 1240 may be configured as or otherwise support a means for transmitting information that is indicative of at least one of an offset parameter or a binary direction parameter, where the binary direction parameter indicates a direction in which the offset parameter is to be applied with respect to a baseline resource block. In some examples, the frequency resource element 1245 may be configured as or otherwise support a means for determining one or more of the frequency resources that are outside of the first initial uplink bandwidth part based on the information.

In some examples, to support transmitting the information that is indicative of at least one of the offset parameter or the binary direction parameter, the frequency resource parameter element 1240 may be configured as or otherwise support a means for transmitting indications of at least one of the offset parameter or the binary direction parameter on a per-random access occasion basis.

In some examples, the random access procedure communication element 1235 may be configured as or otherwise support a means for communicating additional one or more random access messages that are associated with transmission of the random access preamble, the one or more random access messages being communicated in frequency resources that are within a selected initial uplink bandwidth part that corresponds to the random access occasion.

In some examples, to support communicating the additional one or more random access messages, the random access procedure communication element 1235 may be configured as or otherwise support a means for transmitting a random access response message separated in time from transmission of the random access preamble by a duration of time that includes a bandwidth part switching time gap.

In some examples, to support communicating the additional one or more random access messages, the random access procedure communication element 1235 may be configured as or otherwise support a means for receiving a connection request message separated in time from transmission of the random access preamble by a duration of time that includes a bandwidth part switching time gap.

In some examples, to support communicating the additional one or more random access messages, the random access procedure communication element 1235 may be configured as or otherwise support a means for receiving a random access request payload separated in time from transmission of the random access preamble by a duration of time that includes a bandwidth part switching time gap, the random access procedure being a two-step random access procedure.

Figure 13:
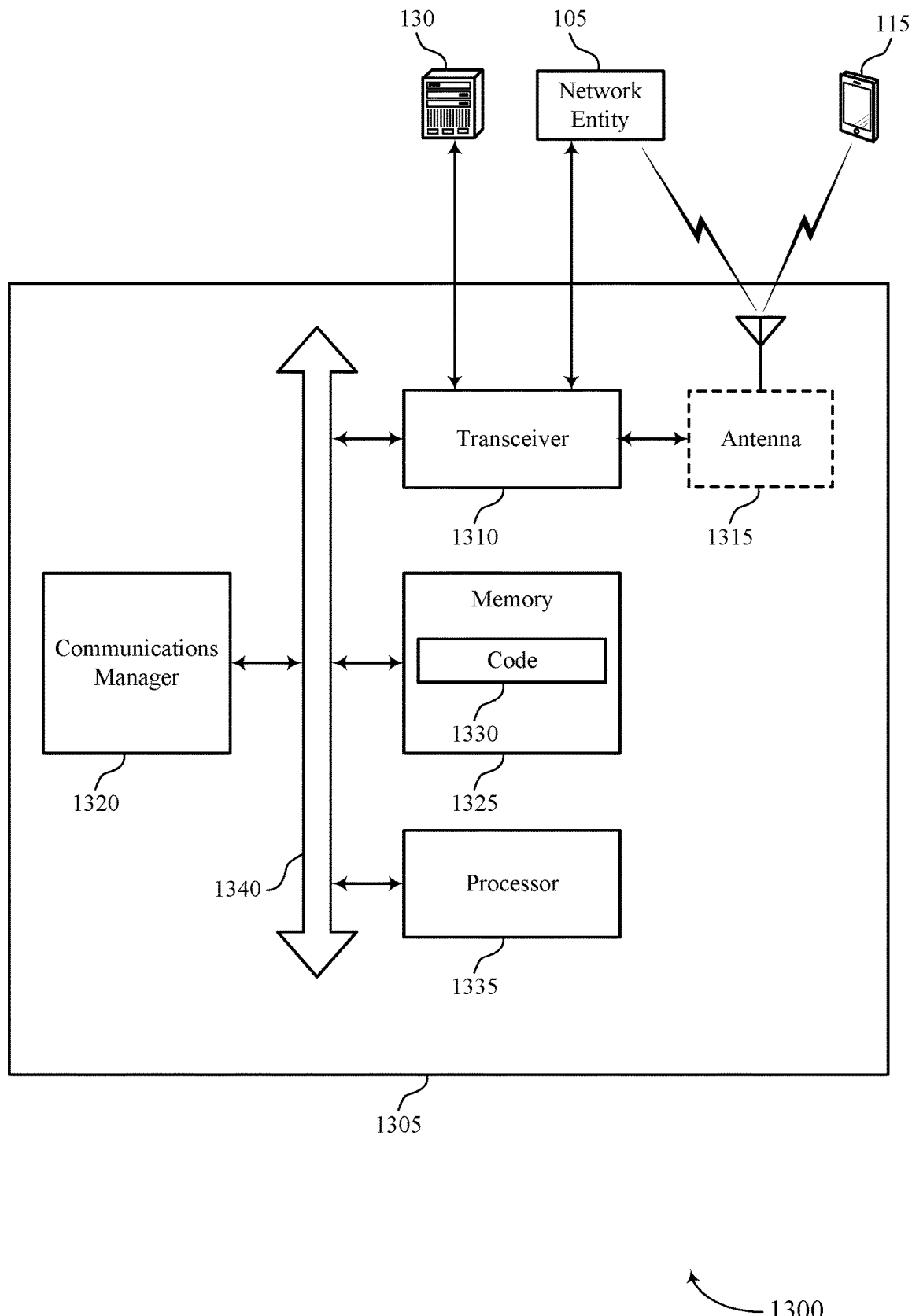
FIG. 13 shows a diagram of a system including a device that supports bandwidth part configuration for reduced capability devices in accordance with one or more aspects of the present disclosure.

FIG. 13 shows a diagram of a system 1300 including a device 1305 that supports bandwidth part configuration for reduced capability devices in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting bandwidth part configuration for reduced capability devices). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

Additionally, or alternatively, the communications manager 1320 may support wireless communications at a network entity in accordance with examples as disclosed herein. For example, the communications manager 1320 may be configured as or otherwise support a means for transmitting a message that indicates a first initial uplink bandwidth part for use by the UE in communications with a network entity, the message also indicating a set of multiple random access occasions, at least one of the set of multiple random access occasions being in frequency resources that are outside of the first initial uplink bandwidth part. The communications manager 1320 may be configured as or otherwise support a means for receiving, as part of a random access procedure, a random access preamble within a random access occasion selected from the plurality of random access occasions.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of bandwidth part configuration for reduced capability devices as described herein, or the processor 1335 and the memory 1325 may be otherwise configured to perform or support such operations.

Figure 14:
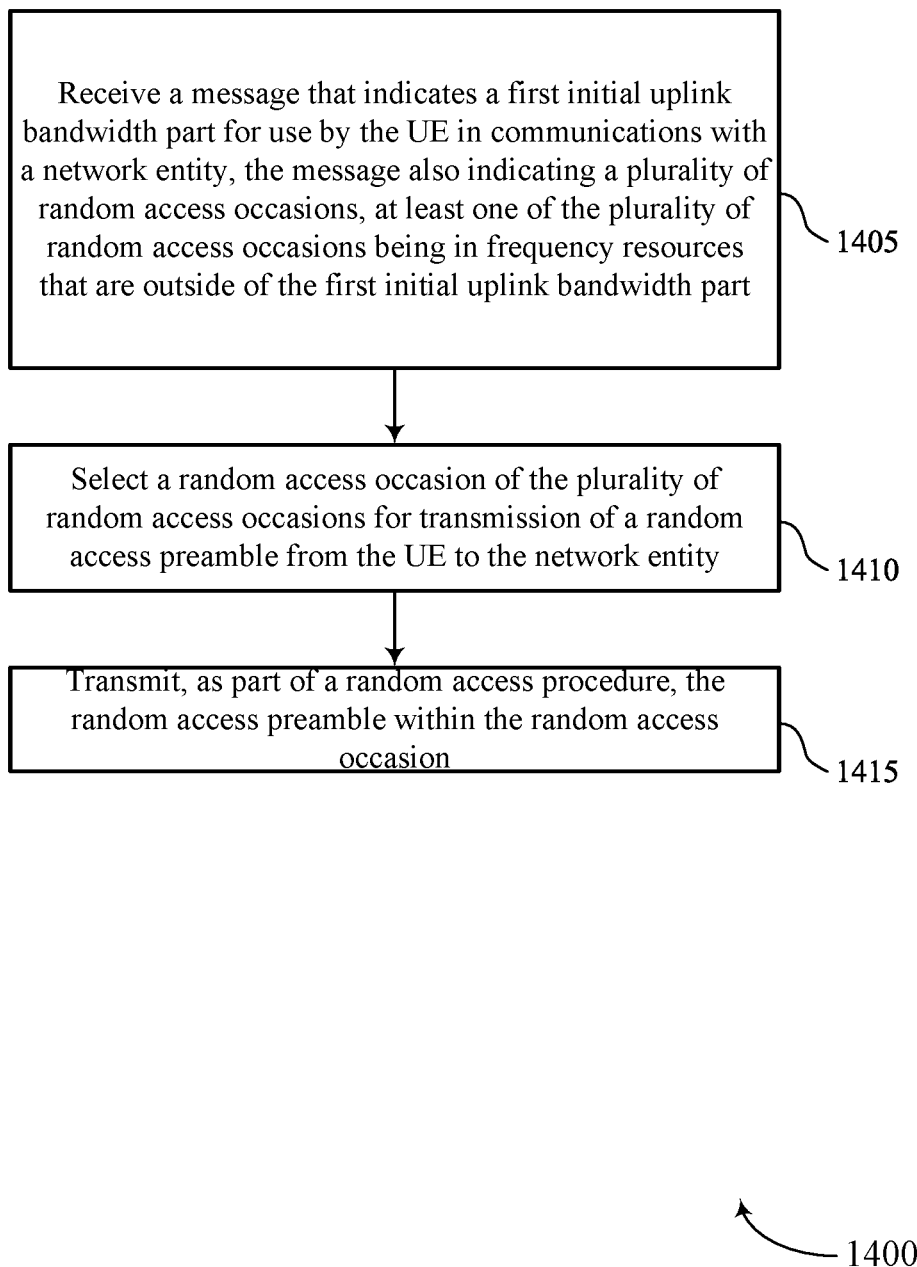
FIGS. 14 through 17 show flowcharts illustrating methods that support bandwidth part configuration for reduced capability devices in accordance with one or more aspects of the present disclosure.

FIG. 14 shows a flowchart illustrating a method 1400 that supports bandwidth part configuration for reduced capability devices in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a message that indicates a first initial uplink bandwidth part for use by the UE in communications with a network entity, the message also indicating a set of multiple random access occasions, at least one of the set of multiple random access occasions being in frequency resources that are outside of the first initial uplink bandwidth part. The operations of 1405 may be performed in accordance with examples as disclosed herein.

In some examples, aspects of the operations of 1405 may be performed by an SSB reception component 825 as described with reference to FIG. 8.

At 1410, the method may include selecting a random access occasion of the set of multiple random access occasions for transmission of a random access preamble from the UE to the network entity. The operations of 1410 may be performed in accordance with examples as disclosed herein. In some examples, aspects of the operations of 1410 may be performed by a RO selection component 830 as described with reference to FIG. 8.

At 1415, the method may include transmitting, as part of a random access procedure, the random access preamble within the random access occasion. The operations of 1415 may be performed in accordance with examples as disclosed herein. In some examples, aspects of the operations of 1415 may be performed by a random access preamble transmission component 835 as described with reference to FIG. 8.

Figure 15:
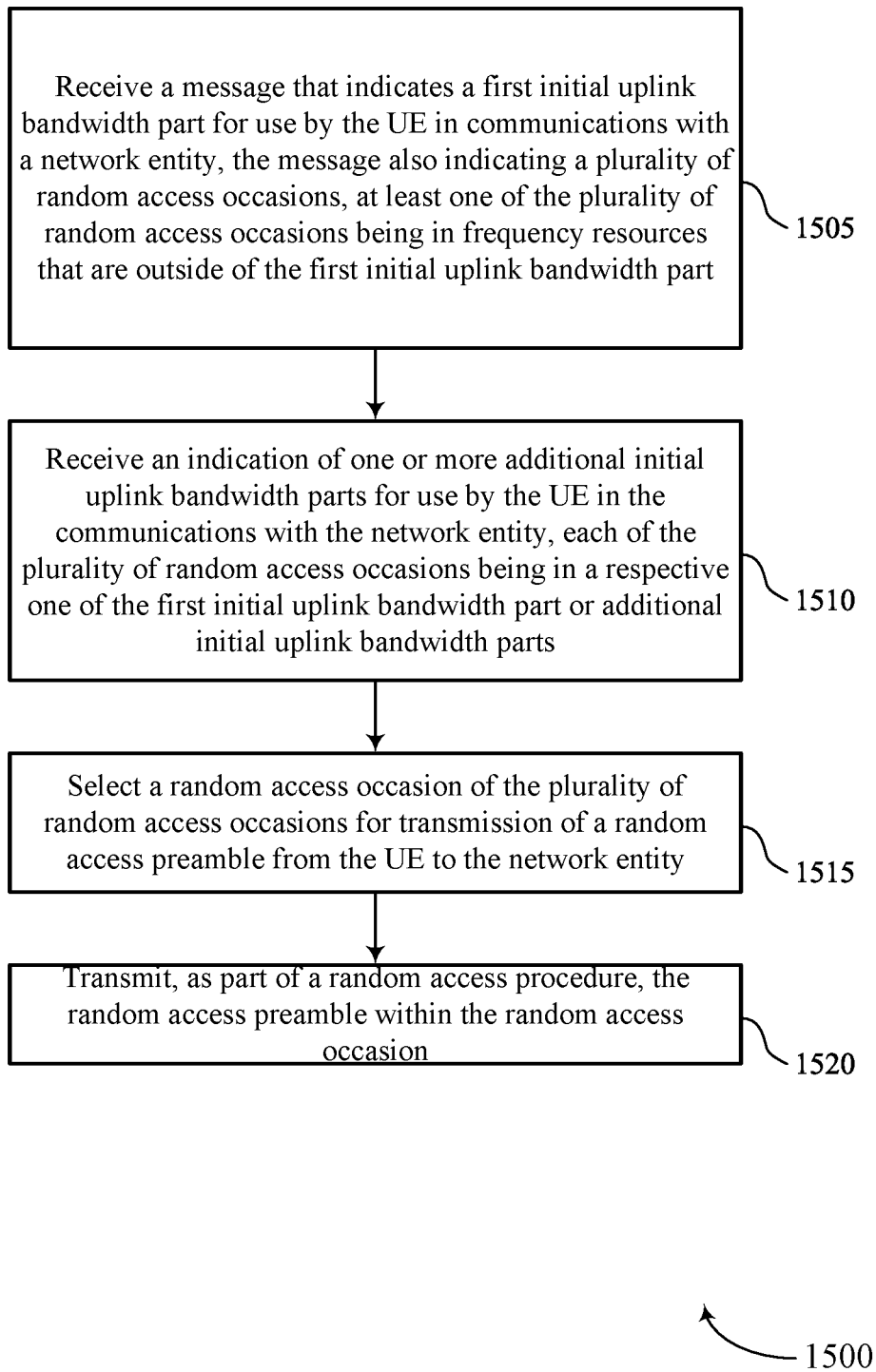

FIG. 15 shows a flowchart illustrating a method 1500 that supports bandwidth part configuration for reduced capability devices in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a message that indicates a first initial uplink bandwidth part for use by the UE in communications with a network entity, the message also indicating a set of multiple random access occasions, at least one of the set of multiple random access occasions being in frequency resources that are outside of the first initial uplink bandwidth part. The operations of 1505 may be performed in accordance with examples as disclosed herein. In some examples, aspects of the operations of 1505 may be performed by an SSB reception component 825 as described with reference to FIG. 8.

At 1510, the method may include receiving an indication of one or more additional initial uplink bandwidth parts for use by the UE in the communications with the network entity, each of the set of multiple random access occasions being in a respective one of the first initial uplink bandwidth part or additional initial uplink bandwidth parts. The operations of 1510 may be performed in accordance with examples as disclosed herein. In some examples, aspects of the operations of 1510 may be performed by an SSB reception component 825 as described with reference to FIG. 8.

At 1515, the method may include selecting a random access occasion of the set of multiple random access occasions for transmission of a random access preamble from the UE to the network entity. The operations of 1515 may be performed in accordance with examples as disclosed herein. In some examples, aspects of the operations of 1515 may be performed by a RO selection component 830 as described with reference to FIG. 8.

At 1520, the method may include transmitting, as part of a random access procedure, the random access preamble within the random access occasion. The operations of 1520 may be performed in accordance with examples as disclosed herein. In some examples, aspects of the operations of 1520 may be performed by a random access preamble transmission component 835 as described with reference to FIG. 8.

Figure 16:
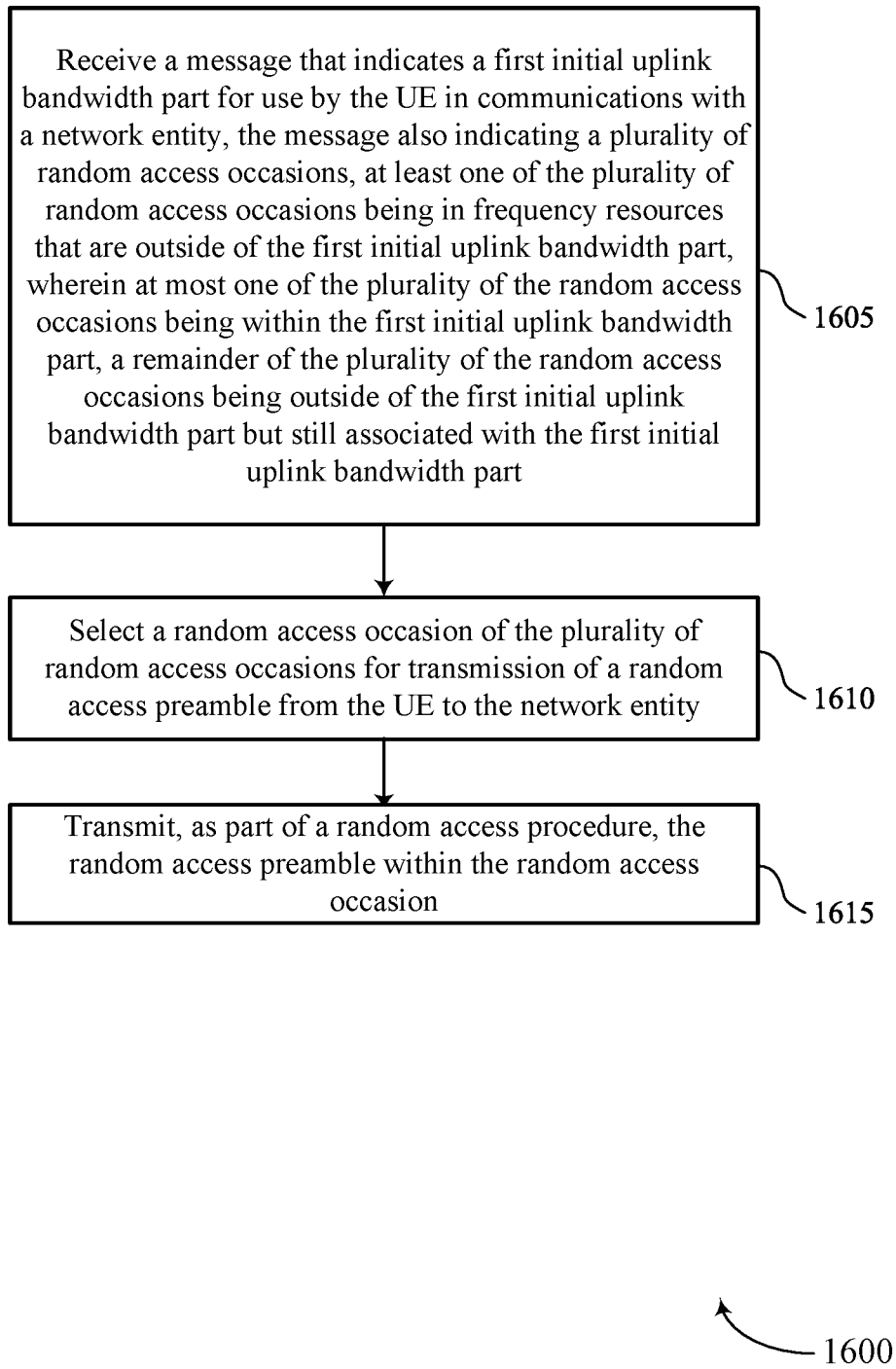

FIG. 16 shows a flowchart illustrating a method 1600 that supports bandwidth part configuration for reduced capability devices in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving a message that indicates a first initial uplink bandwidth part for use by the UE in communications with a network entity, the message also indicating a set of multiple random access occasions, at least one of the set of multiple random access occasions being in frequency resources that are outside of the first initial uplink bandwidth part, wherein at most one of the set of multiple the random access occasions being within the first initial uplink bandwidth part, a remainder of the set of multiple the random access occasions being outside of the first initial uplink bandwidth part but still associated with the first initial uplink bandwidth part. The operations of 1605 may be performed in accordance with examples as disclosed herein. In some examples, aspects of the operations of 1605 may be performed by an SSB reception component 825 as described with reference to FIG. 8.

At 1610, the method may include selecting a random access occasion of the set of multiple random access occasions for transmission of a random access preamble from the UE to the network entity. The operations of 1610 may be performed in accordance with examples as disclosed herein. In some examples, aspects of the operations of 1610 may be performed by a RO selection component 830 as described with reference to FIG. 8.

At 1615, the method may include transmitting, as part of a random access procedure, the random access preamble within the random access occasion. The operations of 1615 may be performed in accordance with examples as disclosed herein. In some examples, aspects of the operations of 1615 may be performed by a random access preamble transmission component 835 as described with reference to FIG. 8.

Figure 17:
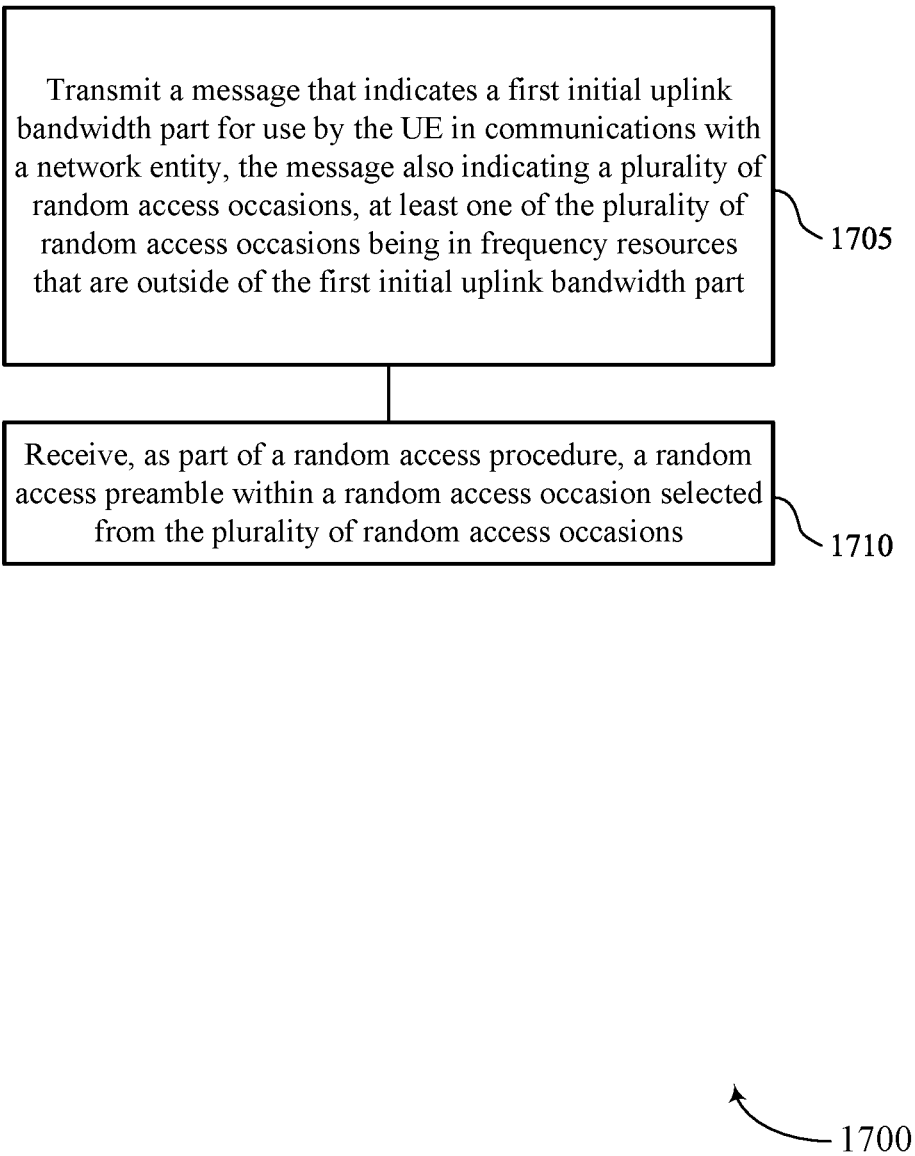

FIG. 17 shows a flowchart illustrating a method 1700 that supports bandwidth part configuration for reduced capability devices in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a message that indicates a first initial uplink bandwidth part for use by a UE in communications with a network entity, the message also indicating a set of multiple random access occasions, at least one of the set of multiple random access occasions being in frequency resources that are outside of the first initial uplink bandwidth part. The operations of 1705 may be performed in accordance with examples as disclosed herein. In some examples, aspects of the operations of 1705 may be performed by an SSB transmission element 1225 as described with reference to FIG. 12.

At 1710, the method may include receiving, as part of a random access procedure, a random access preamble within a random access occasion selected from the plurality of random access occasions. The operations of 1710 may be performed in accordance with examples as disclosed herein. In some examples, aspects of the operations of 1710 may be performed by a random access preamble reception element 1230 as described with reference to FIG. 12.

The following provides an overview of aspects of the present disclosure:

Aspect 1: A method for wireless communications at a UE, comprising: receiving a message that indicates a first initial uplink bandwidth part for use by the UE in communications with a network entity, the message also indicating a plurality of random access occasions, at least one of the plurality of random access occasions being in frequency resources that are outside of the first initial uplink bandwidth part; selecting a random access occasion of the plurality of random access occasions for transmission of a random access preamble from the UE to the network entity; and transmitting, as part of a random access procedure, the random access preamble within the random access occasion.

Aspect 2: The method of aspect 1, wherein receiving the message further comprises: receiving an indication of one or more additional initial uplink bandwidth parts for use by the UE in the communications with the network entity, each of the plurality of random access occasions being in a respective one of the first initial uplink bandwidth part or additional initial uplink bandwidth parts.

Aspect 3: The method of aspect 2, further comprising: communicating additional one or more random access messages that are associated with transmission of the random access preamble, the one or more random access messages being communicated in frequency resources that are within a same one of the first initial uplink bandwidth part or the additional initial uplink bandwidth parts in which the random access preamble is transmitted.

Aspect 4: The method of any of aspects 2 through 3, further comprising: determining that transmission of the random access preamble failed, wherein the random access preamble was transmitted within a first attempted initial uplink bandwidth part selected from the first initial uplink bandwidth part and the additional initial uplink bandwidth parts; incrementing a preamble power ramping parameter based at least in part on failure of the transmission of the random access preamble and on whether the first attempted initial uplink bandwidth part is to be reused for retransmission of the random access preamble; and retransmitting the random access preamble in accordance with the preamble power ramping parameter.

Aspect 5: The method of any of aspects 2 through 4, further comprising: determining that transmission of the random access preamble failed, wherein the random access preamble was transmitted within a first attempted initial uplink bandwidth part selected from the first initial uplink bandwidth part and the additional initial uplink bandwidth parts; incrementing a preamble power ramping parameter based at least in part on failure of the transmission of the random access preamble, regardless of whether the first attempted initial uplink bandwidth part is to be reused for retransmission of the random access preamble; and retransmitting the random access preamble in accordance with the preamble power ramping parameter.

Aspect 6: The method of any of aspects 2 through 5, further comprising: determining that transmission of the random access preamble failed; and retransmitting the random access preamble via any of the first initial uplink bandwidth part or the additional initial uplink bandwidth parts, wherein the retransmitting is in accordance with a maximum number of retransmissions parameter that applies to retransmissions across all of the first initial uplink bandwidth part and the additional initial uplink bandwidth parts, collectively.

Aspect 7: The method of any of aspects 2 through 6, further comprising: determining that transmission of the random access preamble failed, wherein the random access preamble was transmitted within a first attempted initial uplink bandwidth part selected from the first initial uplink bandwidth part and the additional initial uplink bandwidth parts; and retransmitting the random access preamble via the first attempted initial uplink bandwidth part, wherein the retransmitting is in accordance with a maximum number of retransmissions parameter that applies to retransmissions per initial uplink bandwidth part.

Aspect 8: The method of any of aspects 2 through 7, wherein selecting the random access occasion further comprises: monitoring an initial downlink bandwidth part for paging occasions during the random access procedure; identifying, from the first initial uplink bandwidth part and the additional initial uplink bandwidth parts, a corresponding initial uplink bandwidth part that corresponds to the initial downlink bandwidth part; and selecting the random access occasion that is within the corresponding initial uplink bandwidth part based at least in part on the corresponding initial uplink bandwidth part corresponding to the initial downlink bandwidth part.

Aspect 9: The method of any of aspects 1 through 8, wherein at most one of the plurality of the random access occasions is within the first initial uplink bandwidth part, a remainder of the plurality of the random access occasions being outside of the first initial uplink bandwidth part but still associated with the first initial uplink bandwidth part.

Aspect 10: The method of aspect 9, further comprising: receiving information that is indicative of at least one of an offset parameter or a binary direction parameter, wherein the binary direction parameter indicates a direction in which the offset parameter is to be applied with respect to a baseline resource block; determining one or more of the frequency resources that are outside of the first initial uplink bandwidth part based at least in part on the information.

Aspect 11: The method of aspect 10, wherein receiving the information that is indicative of at least one of the offset parameter or the binary direction parameter further comprises: receiving indications of at least one of the offset parameter or the binary direction parameter on a per-random access occasion basis.

Aspect 12: The method of any of aspects 10 through 11, wherein determining one or more of the frequency resources that are outside of the first initial uplink bandwidth part further comprises: determining, based at least in part on the offset parameter, the binary direction parameter, the baseline resource block, and a first frequency resource associated with a first random access occasion of the plurality of random access occasions; and determining additional frequency resources associated with other random access occasions of the plurality of random access occasions, the additional frequency resources determined in relation to the first frequency resource.

Aspect 13: The method of any of aspects 1 through 12, further comprising: communicating additional one or more random access messages that are associated with transmission of the random access preamble, the one or more random access messages being communicated in frequency resources that are within a selected initial uplink bandwidth part that corresponds to the random access occasion.

Aspect 14: The method of aspect 13, wherein communicating the additional one or more random access messages further comprises: receiving a random access response message separated in time from transmission of the random access preamble by a duration of time that includes a bandwidth part switching time gap.

Aspect 15: The method of any of aspects 13 through 14, wherein communicating the additional one or more random access messages further comprises: transmitting a connection request message separated in time from transmission of the random access preamble by a duration of time that includes a bandwidth part switching time gap.

Aspect 16: The method of any of aspects 13 through 15, wherein communicating the additional one or more random access messages further comprises: transmitting a random access request payload separated in time from transmission of the random access preamble by a duration of time that includes a bandwidth part switching time gap, the random access procedure being a two-step random access procedure.

Aspect 17: The method of any of aspects 1 through 16, wherein the message is received through a system information block, a synchronization signal block, downlink control information, a medium access control control element, radio resource control signaling, a handover command, or any combination thereof.

Aspect 18: A method for wireless communications at a network entity, comprising: transmitting a message that indicates a first initial uplink bandwidth part for use by a UE in communications with a network entity, the message also indicating a plurality of random access occasions, at least one of the plurality of random access occasions being in frequency resources that are outside of the first initial uplink bandwidth part; and receiving, as part of a random access procedure, the random access preamble within the random access occasion.

Aspect 19: The method of aspect 18, wherein receiving the message further comprises: transmitting an indication of one or more additional initial uplink bandwidth parts for use by the UE in the communications with the network entity, each of the plurality of random access occasions being in a respective one of the first initial uplink bandwidth part or additional initial uplink bandwidth parts.

Aspect 20: The method of aspect 19, further comprising: communicating additional one or more random access messages that are associated with transmission of the random access preamble, the one or more random access messages being communicated in frequency resources that are within a same one of the first initial uplink bandwidth part or the additional initial uplink bandwidth parts in which the random access preamble is transmitted.

Aspect 21: The method of any of aspects 19 through 20, further comprising: determining that transmission of the random access preamble failed; and receiving a retransmission of the random access preamble via any of the first initial uplink bandwidth part or the additional initial uplink bandwidth parts, wherein the retransmitting is in accordance with a maximum number of retransmissions parameter that applies to retransmissions across all of the first initial uplink bandwidth part and the additional initial uplink bandwidth parts, collectively.

Aspect 22: The method of any of aspects 18 through 21, wherein at most one of the plurality of random access occasions is within the first initial uplink bandwidth part, a remainder of the plurality of random access occasions being outside of the first initial uplink bandwidth part but still associated with the first initial uplink bandwidth part.

Aspect 23: The method of aspect 22, further comprising: transmitting information that is indicative of at least one of an offset parameter or a binary direction parameter, wherein the binary direction parameter indicates a direction in which the offset parameter is to be applied with respect to a baseline resource block; and determining one or more of the frequency resources that are outside of the first initial uplink bandwidth part based at least in part on the information.

Aspect 24: The method of aspect 23, wherein transmitting the information that is indicative of at least one of the offset parameter or the binary direction parameter further comprises: transmitting indications of at least one of the offset parameter or the binary direction parameter on a per-random access occasion basis.

Aspect 25: The method of any of aspects 18 through 24, further comprising: communicating additional one or more random access messages that are associated with transmission of the random access preamble, the one or more random access messages being communicated in frequency resources that are within a selected initial uplink bandwidth part that corresponds to the random access occasion.

Aspect 26: The method of aspect 25, wherein communicating the additional one or more random access messages further comprises: transmitting a random access response message separated in time from transmission of the random access preamble by a duration of time that includes a bandwidth part switching time gap.

Aspect 27: The method of any of aspects 25 through 26, wherein communicating the additional one or more random access messages further comprises: receiving a connection request message separated in time from transmission of the random access preamble by a duration of time that includes a bandwidth part switching time gap.

Aspect 28: The method of any of aspects 25 through 27, wherein communicating the additional one or more random access messages further comprises: receiving a random access request payload separated in time from transmission of the random access preamble by a duration of time that includes a bandwidth part switching time gap, the random access procedure being a two-step random access procedure.

Aspect 29: An apparatus for wireless communications at a UE, comprising a processor; memory coupled with the processor; and instructions stored in the memory and executable by the processor to cause the apparatus to perform a method of any of aspects 1 through 17.

Aspect 30: An apparatus for wireless communications at a UE, comprising at least one means for performing a method of any of aspects 1 through 17.

Aspect 31: A non-transitory computer-readable medium storing code for wireless communications at a UE, the code comprising instructions executable by a processor to perform a method of any of aspects 1 through 17.

Aspect 32: An apparatus for wireless communications at a network entity, comprising a processor; memory coupled with the processor; and instructions stored in the memory and executable by the processor to cause the apparatus to perform a method of any of aspects 18 through 28.

Aspect 33: An apparatus for wireless communications at a network entity, comprising at least one means for performing a method of any of aspects 18 through 28.

Aspect 34: A non-transitory computer-readable medium storing code for wireless communications at a network entity, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   at least one processor; and
   memory coupled to the at least one processor, the memory storing instructions executable by the at least one processor to cause the UE to:
      receive a message that indicates a first initial uplink bandwidth part for use by the UE in communications with a network entity, the message also indicating a plurality of random access occasions, at least one of the plurality of random access occasions being in frequency resources that are outside of the first initial uplink bandwidth part;
      select a random access occasion of the plurality of random access occasions for transmission of a random access preamble from the UE to the network entity; and
      transmit, as part of a random access procedure, the random access preamble within the random access occasion.

2. The apparatus of claim 1, wherein the instructions to receive the message are further executable by the at least one processor to cause the UE to:
   receive an indication of one or more additional initial uplink bandwidth parts for use by the UE in the communications with the network entity, each of the plurality of random access occasions being in a respective one of the first initial uplink bandwidth part or additional initial uplink bandwidth parts.

3. The apparatus of claim 2, wherein the instructions are further executable by the at least one processor to cause the UE to:
   communicate one or more additional random access messages that are associated with transmission of the random access preamble, the one or more additional random access messages being communicated in frequency resources that are within a same one of the first initial uplink bandwidth part or the one or more additional initial uplink bandwidth parts in which the random access preamble is transmitted.

4. The apparatus of claim 2, wherein the instructions are further executable by the at least one processor to cause the UE to:
   determine that transmission of the random access preamble failed, wherein the random access preamble was transmitted within a first attempted initial uplink bandwidth part selected from the first initial uplink bandwidth part and the one or more additional initial uplink bandwidth parts;
   increment a preamble power ramping parameter based at least in part on failure of the transmission of the random access preamble and on whether the first attempted initial uplink bandwidth part is to be reused for retransmission of the random access preamble; and
   retransmit the random access preamble in accordance with the preamble power ramping parameter.

5. The apparatus of claim 2, wherein the instructions are further executable by the at least one processor to cause the UE to:
   determine that transmission of the random access preamble failed, wherein the random access preamble was transmitted within a first attempted initial uplink bandwidth part selected from the first initial uplink bandwidth part and the one or more additional initial uplink bandwidth parts;
   increment a preamble power ramping parameter based at least in part on failure of the transmission of the random access preamble, regardless of whether the first attempted initial uplink bandwidth part is to be reused for retransmission of the random access preamble; and
   retransmit the random access preamble in accordance with the preamble power ramping parameter.

6. The apparatus of claim 2, wherein the instructions are further executable by the at least one processor to cause the UE to:
   determine that transmission of the random access preamble failed; and
   retransmit the random access preamble via any of the first initial uplink bandwidth part or the one or more additional initial uplink bandwidth parts, wherein the retransmitting is in accordance with a maximum number of retransmissions parameter that applies to retransmissions across all of the first initial uplink bandwidth part and the one or more additional initial uplink bandwidth parts, collectively.

7. The apparatus of claim 2, wherein the instructions are further executable by the at least one processor to cause the UE to:
   determine that transmission of the random access preamble failed, wherein the random access preamble was transmitted within a first attempted initial uplink bandwidth part selected from the first initial uplink bandwidth part and the one or more additional initial uplink bandwidth parts; and
   retransmit the random access preamble via the first attempted initial uplink bandwidth part, wherein the retransmitting is in accordance with a maximum number of retransmissions parameter that applies to retransmissions per initial uplink bandwidth part.

8. The apparatus of claim 2, wherein the instructions to select the random access occasion are further executable by the at least one processor to cause the UE to:
   monitor an initial downlink bandwidth part for paging occasions during the random access procedure;
   identify, from the first initial uplink bandwidth part and the one or more additional initial uplink bandwidth parts, a corresponding initial uplink bandwidth part that corresponds to the initial downlink bandwidth part; and
   select the random access occasion that is within the corresponding initial uplink bandwidth part based at least in part on the corresponding initial uplink bandwidth part corresponding to the initial downlink bandwidth part.

9. The apparatus of claim 1, wherein at most one of the plurality of the random access occasions is within the first initial uplink bandwidth part, a remainder of the plurality of the random access occasions being outside of the first initial uplink bandwidth part but still associated with the first initial uplink bandwidth part.

10. The apparatus of claim 9, wherein the instructions are further executable by the at least one processor to cause the UE to:
receive information that is indicative of at least one of a random access occasion offset parameter or a random access occasion binary direction parameter, wherein the random access occasion binary direction parameter indicates a direction in which the random access occasion offset parameter is to be applied with respect to a baseline resource block; and
determine one or more of the frequency resources that are outside of the first initial uplink bandwidth part based at least in part on the information.

11. The apparatus of claim 10, wherein the instructions to receive the information that is indicative of at least one of the random access occasion offset parameter or the random access occasion binary direction parameter are further executable by the at least one processor to cause the UE to:
receive indications of at least one of the random access occasion offset parameter or the random access occasion binary direction parameter on a per-random access occasion basis.

12. The apparatus of claim 10, wherein the instructions to determine one or more of the frequency resources that are outside of the first initial uplink bandwidth part are further executable by the at least one processor to cause the UE to:
determine, based at least in part on the random access occasion offset parameter, the random access occasion binary direction parameter, the baseline resource block, and a first frequency resource associated with a first random access occasion of the plurality of random access occasions; and
determine additional frequency resources associated with other random access occasions of the plurality of random access occasions, the additional frequency resources determined in relation to the first frequency resource.

13. The apparatus of claim 1, wherein the instructions are further executable by the at least one processor to cause the UE to:
communicate one or more additional random access messages that are associated with transmission of the random access preamble, the one or more additional random access messages being communicated in frequency resources that are within a selected initial uplink bandwidth part that corresponds to the random access occasion.

14. The apparatus of claim 13, wherein the instructions to communicate the one or more additional random access messages are further executable by the at least one processor to cause the UE to:
receive a random access response message separated in time from transmission of the random access preamble by a duration of time that includes a bandwidth part switching time gap.

15. The apparatus of claim 13, wherein the instructions to communicate the one or more additional random access messages are further executable by the at least one processor to cause the UE to:
transmit a connection request message separated in time from transmission of the random access preamble by a duration of time that includes a bandwidth part switching time gap.

16. The apparatus of claim 13, wherein the instructions to communicate the one or more additional random access messages are further executable by the at least one processor to cause the UE to:
transmit a random access request payload separated in time from transmission of the random access preamble by a duration of time that includes a bandwidth part switching time gap, the random access procedure being a two-step random access procedure.

17. The apparatus of claim 1, wherein the message is received through a system information block, a synchronization signal block, downlink control information, a medium access control control element, radio resource control signaling, a handover command, or any combination thereof.

18. An apparatus for wireless communications at a network entity, comprising:
at least one processor; and
memory coupled to the at least one processor, the memory storing instructions executable by the at least one processor to cause the network entity to:
transmit a message that indicates a first initial uplink bandwidth part for use by a user equipment (UE) in communications with the network entity, the message also indicating a plurality of random access occasions, at least one of the plurality of random access occasions being in frequency resources that are outside of the first initial uplink bandwidth part; and
receive, as part of a random access procedure, a random access preamble within a random access occasion selected from the plurality of random access occasions.

19. The apparatus of claim 18, wherein the instructions to transmit the message are further executable by the at least one processor to cause the network entity to:
transmit an indication of one or more additional initial uplink bandwidth parts for use by the UE in the communications with the network entity, each of the plurality of random access occasions being in a respective one of the first initial uplink bandwidth part or one or more additional initial uplink bandwidth parts.

20. The apparatus of claim 19, wherein the instructions are further executable by the at least one processor to cause the network entity to:
communicate one or more additional random access messages that are associated with transmission of the random access preamble, the one or more random access messages being communicated in frequency resources that are within a same one of the first initial uplink bandwidth part or the one or more additional initial uplink bandwidth parts in which the random access preamble is transmitted.

21. The apparatus of claim 19, wherein the instructions are further executable by the at least one processor to cause the network entity to:
determine that transmission of the random access preamble failed; and
receive a retransmission of the random access preamble via any of the first initial uplink bandwidth part or the one or more additional initial uplink bandwidth parts, wherein the retransmission is in accordance with a maximum number of retransmissions parameter that applies to retransmissions across all of the first initial uplink bandwidth part and the one or more additional initial uplink bandwidth parts, collectively.

22. The apparatus of claim 18, wherein at most one of the plurality of the random access occasions is within the first initial uplink bandwidth part, a remainder of the plurality of the random access occasions being outside of the first initial uplink bandwidth part but still associated with the first initial uplink bandwidth part.

23. The apparatus of claim 22, wherein the instructions are further executable by the at least one processor to cause the network entity to:
transmit information that is indicative of at least one of a random access occasion offset parameter or a random access occasion binary direction parameter, wherein the random access occasion binary direction parameter indicates a direction in which the random access occasion offset parameter is to be applied with respect to a baseline resource block; and
determine one or more of the frequency resources that are outside of the first initial uplink bandwidth part based at least in part on the information.

24. The apparatus of claim 23, wherein the instructions to transmit the information that is indicative of at least one of the random access occasion offset parameter or the random access occasion binary direction parameter are further executable by the at least one processor to cause the network entity to:
transmit indications of at least one of the random access occasion offset parameter or the random access occasion binary direction parameter on a per-random access occasion basis.

25. The apparatus of claim 18, wherein the instructions are further executable by the at least one processor to cause the network entity to:
communicate one or more additional random access messages that are associated with transmission of the random access preamble, the one or more additional random access messages being communicated in frequency resources that are within a selected initial uplink bandwidth part that corresponds to the random access occasion.

26. The apparatus of claim 25, wherein the instructions to communicate the one or more additional random access messages are further executable by the at least one processor to cause the network entity to:
transmit a random access response message separated in time from transmission of the random access preamble by a duration of time that includes a bandwidth part switching time gap.

27. The apparatus of claim 25, wherein the instructions to communicate the one or more additional random access messages are further executable by the at least one processor to cause the network entity to:
receive a connection request message separated in time from transmission of the random access preamble by a duration of time that includes a bandwidth part switching time gap.

28. The apparatus of claim 25, wherein the instructions to communicate the one or more additional random access messages are further executable by the at least one processor to cause the network entity to:
receive a random access request payload separated in time from transmission of the random access preamble by a duration of time that includes a bandwidth part switching time gap, the random access procedure being a two-step random access procedure.

29. A method for wireless communications at a user equipment (UE), comprising:
receiving a message that indicates a first initial uplink bandwidth part for use by the UE in communications with a network entity, the message also indicating a plurality of random access occasions, at least one of the plurality of random access occasions being in frequency resources that are outside of the first initial uplink bandwidth part;
selecting a random access occasion of the plurality of random access occasions for transmission of a random access preamble from the UE to the network entity; and
transmitting, as part of a random access procedure, the random access preamble within the random access occasion.

30. A method for wireless communications at a network entity, comprising:
transmitting a message that indicates a first initial uplink bandwidth part for use by a user equipment (UE) in communications with the network entity, the message also indicating a plurality of random access occasions, at least one of the plurality of random access occasions being in frequency resources that are outside of the first initial uplink bandwidth part; and
receiving, as part of a random access procedure, a random access preamble within a random access occasion selected from the plurality of random access occasions.

* * * * *